US010498590B1

(12) United States Patent
Ezra et al.

(10) Patent No.: US 10,498,590 B1
(45) Date of Patent: Dec. 3, 2019

(54) DATA STRUCTURE FOR SERVICE PATH RESTORATION IN DATA COMMUNICATION NETWORKS

(71) Applicant: ECI Telecom Ltd., Petah Tikva (IL)

(72) Inventors: Shirel Ezra, Moshave gane tal d.n nachal sorek (IL); Efraim Gelman, Ramat Gan (IL); Inbal Hecht, Petah Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 16/248,375

(22) Filed: Jan. 15, 2019

Related U.S. Application Data

(63) Continuation of application No. PCT/IB2018/060210, filed on Dec. 17, 2018.

(51) Int. Cl.
*G06F 11/00* (2006.01)
*H04L 12/24* (2006.01)
(Continued)

(52) U.S. Cl.
CPC ...... *H04L 41/0668* (2013.01); *H04L 41/0677* (2013.01); *H04L 45/123* (2013.01); *H04L 45/24* (2013.01)

(58) Field of Classification Search
CPC . H04L 1/22; H04L 12/18; H04L 12/28; H04L 12/66; H04L 12/437; H04L 12/462; H04L 12/4633; H04L 12/4645; H04L 12/5601; H04L 41/06; H04L 41/0654; H04L 41/0663; H04L 41/0668; H04L 41/0677; H04L 41/0803; H04L 41/0806; H04L 41/0816; H04L 41/0836; H04L 41/0856; H04L 41/0863; H04L 41/0866; H04L 41/0893; H04L 41/0896; H04L 41/12; H04L 41/16; H04L 41/147; H04L 41/5003; H04L 2212/00; H04L 2212/562;
(Continued)

(56) References Cited

U.S. PATENT DOCUMENTS

| | | | |
|---|---|---|---|
| 6,996,065 B2* | 2/2006 | Kodialam | H04L 45/12 370/238 |
| 7,242,679 B1* | 7/2007 | Cortez | H04L 45/02 370/351 |

(Continued)

*Primary Examiner* — Tri H Phan
(74) *Attorney, Agent, or Firm* — Finnegan, Henderson, Farabow, Garrett & Dunner, LLP

(57) ABSTRACT

Techniques for migrating a plurality of communications services in a data communication network are disclosed. Aspects include accessing a migration map for the plurality of communications services in the data communication network; identifying a communications dependency between a first service and a second service in the plurality of communications services, wherein according to the migration map the first service is configured to migrate from a first route to a second route, the second service is configured to migrate from a third route to a fourth route, and the third route overlaps with the second route; determining, based on the identified communications dependency, a migration sequence for migrating the plurality of communications services in the data communication network; and migrating the plurality of communications services from a first plurality of configurations to a second plurality of configurations according to the migration sequence.

15 Claims, 20 Drawing Sheets

(51) Int. Cl.
*H04L 12/721* (2013.01)
*H04L 12/707* (2013.01)

(58) Field of Classification Search
CPC ..... H04L 2212/5627; H04L 2212/5642; H04L 2212/5651; H04L 43/02; H04L 43/08; H04L 43/0823; H04L 43/0811; H04L 43/0817; H04L 43/0894; H04L 43/0852; H04L 43/0876; H04L 43/16; H04L 43/50; H04L 45/00; H04L 45/02; H04L 45/04; H04L 45/12; H04L 45/14; H04L 45/16; H04L 45/18; H04L 45/20; H04L 45/22; H04L 45/24; H04L 45/28; H04L 45/32; H04L 45/42; H04L 45/46; H04L 45/48; H04L 45/50; H04L 45/62; H04L 45/70; H04L 45/121–126; H04L 45/507; H04L 45/586; H04L 45/745; H04L 47/10; H04L 47/29; H04L 47/31; H04L 47/39; H04L 47/125; H04L 47/127; H04L 47/785; H04L 47/827; H04L 49/00; H04L 49/70; H04L 67/01; H04L 12/24; H04L 41/0659; H04L 41/0672; H04L 41/0695; H04L 41/08; H04L 41/0813; H04L 41/0873; H04L 67/34; H04L 67/125; H04L 69/40; H04W 24/02; G06F 11/00; G06F 15/177
See application file for complete search history.

(56) References Cited

U.S. PATENT DOCUMENTS

| | | | | |
|---|---|---|---|---|
| 7,283,741 | B2 * | 10/2007 | Sadananda | H04J 45/02 398/5 |
| 7,391,732 | B1 * | 6/2008 | Cortez | H04L 41/0668 370/238 |
| 7,406,032 | B2 * | 7/2008 | Li | H04L 41/06 370/217 |
| 7,643,408 | B2 * | 1/2010 | Atkinson | H04L 41/0668 370/217 |
| 7,978,594 | B2 * | 7/2011 | Kodialam | H04L 45/04 370/216 |
| 8,027,245 | B2 * | 9/2011 | Kodialam | H04L 45/04 370/216 |
| 8,619,553 | B2 * | 12/2013 | Madrahalli | H04J 3/14 370/216 |
| 9,559,947 | B2 * | 1/2017 | Bottari | H04Q 3/0079 |
| 2010/0157792 | A9 * | 6/2010 | Johri | H04L 1/22 370/225 |

* cited by examiner

US 10,498,590 B1

DATA STRUCTURE FOR SERVICE PATH RESTORATION IN DATA COMMUNICATION NETWORKS

This application is a continuation of PCT International Application No. PCT/IB2018/060210, filed Dec. 17, 2018. The foregoing application is incorporated herein by reference in its entirety.

TECHNICAL FIELD

The present disclosure relates to the field of data communication networks and, more particularly, to systems and methods for migrating services in a data communication network, network optimization, traffic grooming, and service link restoration.

BACKGROUND

A data communication network infrastructure, such as the Internet, can be composed of a large number of network nodes that are connected among one another. Network nodes refer to network components (e.g., clients, servers, microservices, virtual machines, serverless code instances, IoT devices, etc.) that communicate with one another according to predetermined protocols by means of wired or wireless communication links. The data communication network provides services to users according to requirements of the services, such as quality of service (QoS) commitments. Different types of services with different QoS requirements may be provided by the data communication network via different service links formed by the network nodes deployed in the network.

In a data communication network, resources for services are allocated and optimized according to a current state of the network. With arrivals of new service demands, there is often a need to migrate existing services to different sets of configurations, such as different service routes, resource allocations, or the like. In such circumstances, it is desirable to migrate the existing services smoothly such that the service disruption is minimized. Further, when a network link failure occurs, there is a need to provide restoration schemes to services that are impacted by the network link failure. For a large data communication network involving a large number of network nodes, the computation complexity to determine the restoration schemes can be high, and a computationally efficient method to provide restoration schemes in case of a network link failure is desired. It is also desired that a minimal number of service links is used to satisfy the service demands in the data communication network so as to reduce the cost of operating the network.

SUMMARY

In one disclosed embodiment, a method for migrating a plurality of communications services in a data communication network is disclosed. The method comprises accessing a migration map for the plurality of communications services in the data communication network; identifying a communications dependency between a first service and a second service in the plurality of communications services, wherein according to the migration map the first service is configured to migrate from a first route to a second route, the second service is configured to migrate from a third route to a fourth route, and the third route overlaps with the second route; determining, based on the identified communications dependency, a migration sequence for migrating the plurality of communications services in the data communication network; and migrating the plurality of communications services from a first plurality of configurations to a second plurality of configurations according to the migration sequence.

In another disclosed embodiment, a network management system for migrating a plurality of communications services in a data communication network is disclosed. The network management system comprises at least one processor and a memory for storing instructions executable by the processor. The at least one processor is configured to access a migration map for the plurality of communications services in the data communication network; identify a communications dependency between a first service and a second service in the plurality of communications services, wherein according to the migration map the first service is configured to migrate from a first route to a second route, the second service is configured to migrate from a third route to a fourth route, and the third route overlaps with the second route; determine, based on the identified communications dependency, a migration sequence for migrating the plurality of communications services in the data communication network; and migrate the plurality of communications services from a first plurality of configurations to a second plurality of configurations according to the migration sequence.

In another disclosed embodiment, a non-transitory computer readable medium is disclosed. The non-transitory computer readable medium stores a set of instructions that is executable by at least one processor of a network management system to cause the network management system to perform operations for migrating a plurality of communications services in a data communication network. The operations comprise accessing a migration map for the plurality of communications services in the data communication network; identifying a communications dependency between a first service and a second service in the plurality of communications services, wherein according to the migration map the first service is configured to migrate from a first route to a second route, the second service is configured to migrate from a third route to a fourth route, and the third route overlaps with the second route; determining, based on the identified communications dependency, a migration sequence for migrating the plurality of communications services in the data communication network; and migrating the plurality of communications services from a first plurality of configurations to a second plurality of configurations according to the migration sequence.

In another disclosed embodiment, a method for providing one or more restoration paths in a data communication network is disclosed. The method comprises identifying a failure in one or more service paths of the data communication network; determining one or more affected service links in the data communication network based on the identified failure and a first data structure, wherein the first data structure includes a plurality of service paths and one or more corresponding service links that use the service path; determining one or more affected service demands based on the affected service links and a second data structure, wherein the second data structure includes a plurality of service links provided by the data communication network and one or more service demands corresponding to one or more of the service links, wherein the one or more service demands in the second data structure require service delivered from a first service node to a second service node, and wherein corresponding service links can be used to satisfy the corresponding service demands; for each of the affected service demands, determining one or more allowed service links by removing the affected service links from a set of corresponding service links for the affected service demands; and for each of the affected service demands, determining the one or more restoration paths based on the one or more allowed service links.

In another disclosed embodiment, a network management system for providing one or more restoration paths in a data communication network is disclosed. The network management system comprises at least one processor and a memory for storing instructions executable by the processor. The at least one processor is configured to identify a failure in one or more service paths of the data communication network; determine one or more affected service links in the data communication network based on the identified failure and a first data structure, wherein the first data structure includes a plurality of service paths and one or more corresponding service links that use the service path; determine one or more affected service demands based on the affected service links and a second data structure, wherein the second data structure includes a plurality of service links provided by the data communication network and one or more service demands corresponding to one or more of the service links, wherein the one or more service demands in the second data structure require service delivered from a first service node to a second service node, and wherein corresponding service links can be used to satisfy the corresponding service demands; for each of the affected service demands, determine one or more allowed service links by removing the affected service links from a set of corresponding service links for the affected service demands; and for each of the affected service demands, determine the one or more restoration paths based on the one or more allowed service links.

In another disclosed embodiment, a non-transitory computer readable medium is disclosed. The non-transitory computer readable medium stores a set of instructions that is executable by at least one processor of a network management system to cause the network management system to perform operations for providing one or more restoration paths in a data communication network. The operations comprise identifying a failure in one or more service paths of the data communication network; determining one or more affected service links in the data communication network based on the identified failure and a first data structure, wherein the first data structure includes a plurality of service paths and one or more corresponding service links that use the service path; determining one or more affected service demands based on the affected service links and a second data structure, wherein the second data structure includes a plurality of service links provided by the data communication network and one or more service demands corresponding to one or more of the service links, wherein the one or more service demands in the second data structure require service delivered from a first service node to a second service node, and wherein corresponding service links can be used to satisfy the corresponding service demands; for each of the affected service demands, determining one or more allowed service links by removing the affected service links from a set of corresponding service links for the affected service demands; and for each of the affected service demands, determining the one or more restoration paths based on the one or more allowed service links.

In another disclosed embodiment, a method for restoring one or more service demands in a data communication network is disclosed. The method comprises identifying a communications route cycle through a set of vertices, wherein the set of vertices includes a plurality of vertices, each of the plurality of vertices corresponding to an end point of at least one service demand, and the plurality of vertices including two vertices corresponding to end points of each of the service demands; identifying a path between a pair of vertices among the plurality of vertices, the pair of vertices corresponding to end points of a service demand, wherein the path is disjoint to the communications route cycle; and determining a set of service links corresponding to the one or more service demands based on the identified path and communication route cycle.

In another disclosed embodiment, a network management system for restoring one or more service demands in a data communication network is disclosed. The network management system comprises at least one processor and a memory for storing instructions executable by the processor. The at least one processor is configured to identify a communications route cycle through a set of vertices, wherein the set of vertices includes a plurality of vertices, each of the plurality of vertices corresponding to an end point of at least one service demand, and the plurality of vertices including two vertices corresponding to end points of each of the service demands; identify a path between a pair of vertices among the plurality of vertices, the pair of vertices corresponding to end points of a service demand, wherein the path is disjoint to the communications route cycle; and determine a set of service links corresponding to the one or more service demands based on the identified path and communication route cycle.

In another disclosed embodiment, a non-transitory computer readable medium is disclosed. The non-transitory computer readable medium stores a set of instructions that is executable by at least one processor of a network management system to cause the network management system to perform operations for restoring one or more service demands in a data communication network. The operations comprise identifying a communications route cycle through a set of vertices, wherein the set of vertices includes a plurality of vertices, each of the plurality of vertices corresponding to an end point of at least one service demand, and the plurality of vertices including two vertices corresponding to end points of each of the service demands; identifying a path between a pair of vertices among the plurality of vertices, the pair of vertices corresponding to end points of a service demand, wherein the path is disjoint to the communications route cycle; and determining a set of service links corresponding to the one or more service demands based on the identified path and communication route cycle.

In another disclosed embodiment, a method for determining sets of service links for a plurality of service demands in a data communication network is disclosed. The method comprises identifying a plurality of connected components in a service demand graph, wherein each of the connected components is formed by one or more edges and one or more vertices, and the number of edges included in each of the plurality of connected components is less than or equal to a predetermined size threshold; calculating a cost associated with each of the plurality of connected components; determining sets of service demands based on the plurality of connected components and the calculated cost; and determining the sets of service links for the plurality of service demands based on the sets of service demands.

In another disclosed embodiment, a network management system for determining sets of service links for a plurality of service demands in a data communication network is disclosed. The network management system comprises at least one processor and a memory for storing instructions executable by the processor. The at least one processor is configured to identify a plurality of connected components in a service demand graph, wherein each of the connected components is formed by one or more edges and one or more vertices, and the number of edges included in each of the plurality of connected components is less than or equal to a predetermined size threshold; calculate a cost associated with each of the plurality of connected components; determine sets of service demands based on the plurality of connected components and the calculated cost; and determine the sets of service links for the plurality of service demands based on the sets of service demands.

In another disclosed embodiment, a non-transitory computer readable medium is disclosed. The non-transitory computer readable medium stores a set of instructions that is executable by at least one processor of a network management system to cause the network management system to perform operations for determining sets of service links for a plurality of service demands in a data communication network. The operations comprise identifying a plurality of connected components in a service demand graph, wherein each of the connected components is formed by one or more edges and one or more vertices, and the number of edges included in each of the plurality of connected components is less than or equal to a predetermined size threshold; calculating a cost associated with each of the plurality of connected components; determining sets of service demands based on the plurality of connected components and the calculated cost; and determining the sets of service links for the plurality of service demands based on the sets of service demands.

The foregoing general description and the following detailed description are exemplary and explanatory only, and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
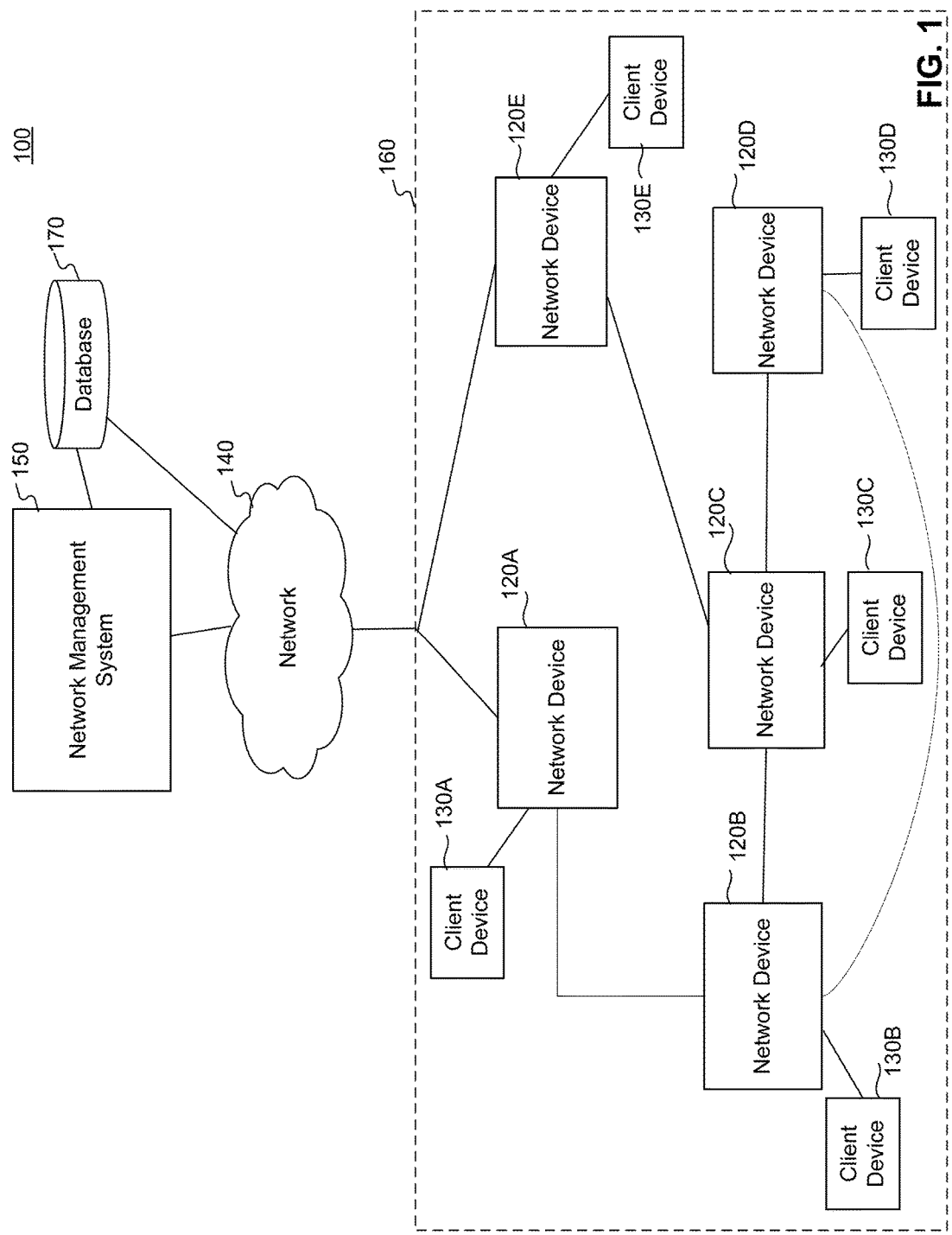
FIG. 1 is a diagram of an example data communication network in which various implementations described herein may be practiced.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows an example data communication network 100 in which various implementations as described herein may be practiced. Data communication network 100 includes, for example, a network 140, network management system 150, database 170, network devices 120A-120E, and client devices 130A-130E. The network devices 120A-120E and client devices 130A-130E form a service network 160, in which the network devices 120A-120E (collectively 120) provide data services to client devices 130A-130E (collectively 130). The network devices may be hardware-based or software-based switches, routers, splitters, or the like that facilitate delivery of data services to client devices 130. The components and arrangements shown in FIG. 1 are not intended to limit the disclosed embodiments, as the system components used to implement the disclosed processes and features can vary. For example, each network device 120 may be associated with no, one, or many client devices 130. In various embodiments, service network 160 may be based on one or more of on-premises network environments, virtualized (cloud) network environments, or combinations of on-premises and cloud networks. Consistent with embodiments described herein, various types of data may be communicated over service network 160, such as Internet (e.g., IP protocol) data, telephony or telecommunications data, satellite data, IoT-based data, cellular data, proprietary network data, and more.

Network management system 150 is configured to manage service deliveries for the service network 160. For example, the network management system 150 may determine service routes and allocate resources for services to be delivered in the data communication network 100. The network management system 150 may also reallocate resources for the existing services when new service demands arrive at the data communication network 100. In some embodiments, the network management system 150 may manage sequences of service migrations when multiple services are to be reconfigured in the data communication network 100. In some embodiments, when a link failure occurs, the network management system 150 may identify restoration schemes for the disrupted service. For example, the network management system 150 may identify alternate service links that do not involve the failed communication link. In some embodiments, the network management system 150 may identify a set of service links that is sufficient to satisfy the service demands in the data communication network 100 and in the meantime reduce the operation cost (e.g., in terms of equipment usage, bandwidth, processing activity, monetary cost, etc.) in the network. Network management system 150 can be a computer-based system including computer system components, desktop computers, workstations, tablets, handheld computing devices, memory devices, and/or internal network(s) connecting the components.

Network 140 facilitates communication between the network management system 150 and the service network 160. Network management system 150 may send data to network devices 120 via network 140 to allocate resources for services in the data communication network 100. Network management system 150 may also receive data from network devices 120 via network 140 indicating the status of service links in the data communication network 100. Network 140 may be an electronic network. Network devices 120 may be configured to receive data over network 140 and process/analyze queries and data. Examples of network 140 include a local area network (LAN), a wireless LAN (e.g., a "WiFi" or mesh network), a Metropolitan Area Network (MAN) that connects multiple LANs, a wide area network (WAN) (e.g., the Internet), a dial-up connection (e.g., using a V.90 protocol or a V.92 protocol), a satellite-based network, a cellular-based network, etc. In the embodiments described herein, the Internet may include any publicly-accessible network or networks interconnected via one or more communication protocols, including, but not limited to, hypertext transfer protocol (HTTP/s) and transmission control protocol/internet protocol (TCP/IP). Moreover, the electronic network may also include one or more mobile device networks, such as a Long Term Evolution (LTE) network or a Personal Communication Service (PCS) network, that allow mobile devices (e.g., client devices 130) to send and receive data via applicable communication protocols, including those described above.

In the illustrated example, network devices 120A and 120E are directly connected to network 140, and network devices 120B-120D connect to the network 140 via their connection to network device 120A and/or 120E. One of ordinary skill in the art would appreciate that network devices 120B-120D may also directly connect to the network 140, or may indirectly connect to the network 140 through numerous other devices. Network devices 120 may be connected to one another via copper wire, coaxial cable, optical fiber, microwave links, or other satellite or radio communication components. Accordingly, network devices 120 may each have a corresponding communications interface (e.g., wireless transceiver, wired transceiver, adapter, etc.) to allow for such communications.

As shown in FIG. 1, network devices 120A-120E are connected to one another. In this example, network device 120A is connected to network device 120B, network device 120B is connected to network devices 120A, 120C, and 120D, network device 120C is connected to network devices 120B, 120D, and 120E, network device 120D is connected to network device 120C, and network device 120E is connected to network device 120C. In some embodiments, a network topology may be formed to present a graphical view of the service network 160, where each of the network device 120 corresponds to a network node or vertex in the network topology. In this disclosure, the terms "node" and "vertex" are exchangeable. The network topology also shows the interconnection relationships among the network devices. In some embodiments, the network management system 150 may obtain the connectivity status between the network devices and generate a network topology. In other embodiments, the network management system 150 may acquire the network topology from a server or a database associated with a service provider providing the service network. One of ordinary skill in the art would appreciate that the service network 160 illustrated in FIG. 1 is merely an example, and the network topology of service network 160 can be different from the example without departing from the scope of the present disclosure.

Network management system 150 may reside in a server or may be configured as a distributed system including network devices or as a distributed computer system including multiple servers, server farms, clouds, computers, or virtualized computing resources that interoperate to perform one or more of the processes and functionalities associated with the disclosed embodiments.

Database 170 includes one or more physical or virtual storages coupled with the network management system 150. Database 170 may be configured to store information associated with the service network 160, such as the network topology, the capability of the network devices, the services and corresponding configurations provided by the service network, and so on. Database 170 may also be adapted to store processed information associated with the network topology and services in the service network 160, so as to facilitate efficient route configurations and resource allocations to satisfy the service demands in the service network 160. The data stored in the database 170 may be transmitted to the network management system 150 and/or the network devices 120. In some embodiments, the database 170 is stored in a cloud-based server (not shown) that is accessible by the network management system 150 and/or the network devices 120 through the network 140. While the database 170 is illustrated as an external device connected to the network management system 150, the database 170 may also reside within the network management system 150 as an internal component of the network management system 150.

As shown in FIG. 1, network devices 120A-120E are connected with client devices 130A-130E respectively to deliver services. As an example, client devices 130A-130E include a display such as a television, tablet, computer monitor, video conferencing console, IoT device, or laptop computer screen. Client devices 130A-130E may also include video/audio input devices such as a video camera, web camera, or the like. As another example, client devices 130A-130E include mobile devices such as a tablet or a smartphone having display and video/audio capture capabilities. While FIG. 1 shows one client device 130 connected to each network device 120, one of ordinary skill in the art would appreciate that more than one client device may be connected to a network device and that in some instances a network device may not be connected to any client device.

In some embodiments, the data communication network 100 may include an optical network, where the network devices 120 are interconnected by optical fiber links. The optical fiber links may be capable of conveying a plurality of optical channels using a plurality of specified different optical wavelengths. The optical network may be based on a wavelength division multiplexing (WDM) physical layer. A WDM optical signal comprises a plurality of transmission channels, each channel carrying an information signal modulated over a carrier wavelength. For example, the network devices 120 may be provided with the ability to switch a channel from an input fiber to an output fiber, and to add/drop traffic. The network devices 120 may include a wavelength switch or an optical add/drop multiplexer that performs optical add, drop, and pass through. The network devices 120 may include optical or optical/electrical elements being adapted to perform to various functions such as compensating, amplifying, switching, restoring, performing wavelength conversion of incoming optical signals, etc. The optical fiber links may include dispersion compensation fibers (DCF), optical filters, amplifiers and other relevant optical components that are used for operation of optical networks. The network management system 150 or data-based 170 may store topologic data includes information about optical channels and their associated wavelengths. In some embodiments, the data communication network 100 may include a network controller (not shown) configured to improve network utilization by providing an optimal routing and wavelength assignment plan for a given set of service demands. In the context of an optical network, a service demand is a request for a wavelength between two nodes in the network. A circuit is provisioned to satisfy a service demand and is characterized by a route and assigned wavelength number.

Figure 2:
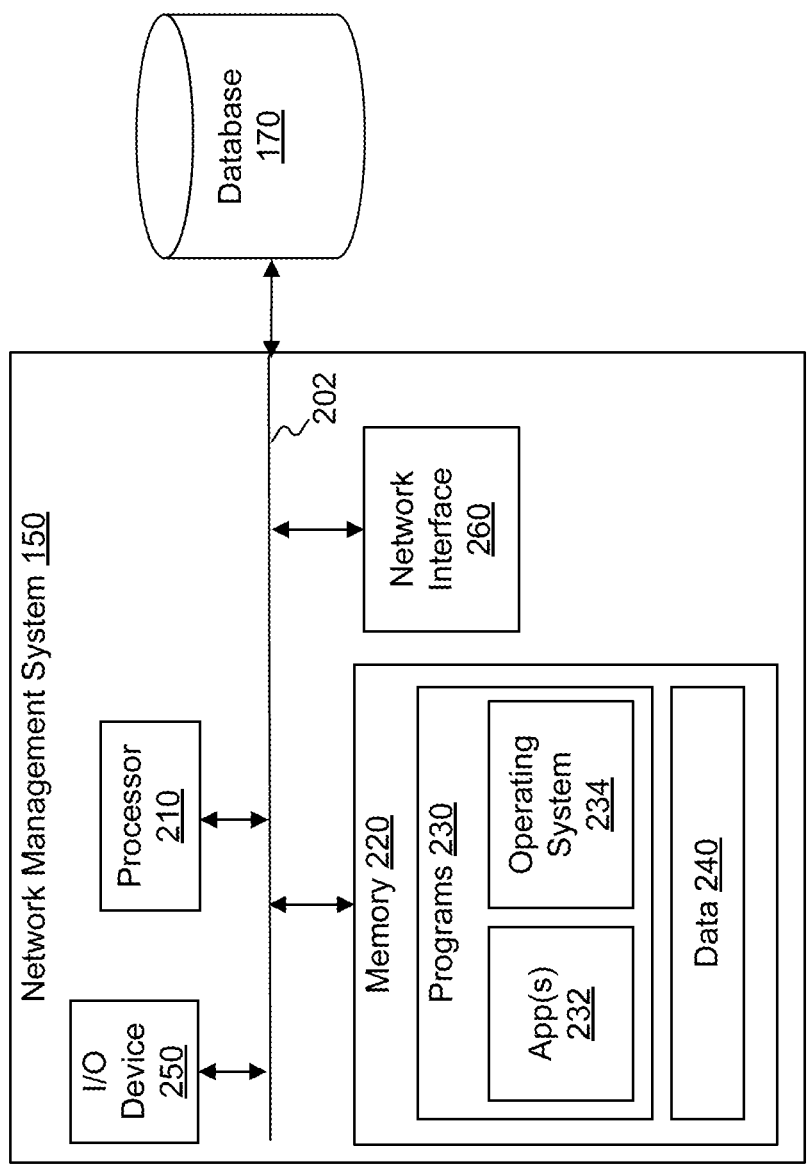
FIG. 2 is a diagram of an example network management system, consistent with the disclosed embodiments.

FIG. 2 shows a diagram of an example network management system 150, consistent with the disclosed embodiments. The network management system 150 may be implemented as a specially made machine that is specially programmed to perform functions relating to managing a data communication network. The special programming at the network management system 150 enables network management system to determine service routes and allocate resources for services to be delivered in the data communication network 100.

The network management system 150 includes a bus 202 (or other communication mechanism) which interconnects subsystems and components for transferring information within the network management system 150. As shown, the network management system 150 includes one or more processors 210, input/output ("I/O") devices 250, network interface 260 (e.g., a modem, Ethernet card, or any other interface configured to exchange data with a network), and one or more memories 220 storing programs 230 including, for example, server app(s) 232, operating system 234, and data 240, and can communicate with an external database 170 (which, for some embodiments, may be included within the network management system 150).

The processor 210 may be one or more processing devices configured to perform functions of the disclosed methods, such as a microprocessor manufactured by Intel™ or manufactured by AMD™. The processor 210 may comprise a single core or multiple core processors executing parallel processes simultaneously. For example, the processor 210 may be a single core processor configured with virtual processing technologies. In certain embodiments, the processor 210 may use logical processors to simultaneously execute and control multiple processes. The processor 210 may implement virtual machine technologies, or other technologies to provide the ability to execute, control, run, manipulate, store, etc. multiple software processes, applications, programs, etc. In some embodiments, the processor 210 may include a multiple-core processor arrangement (e.g., dual, quad core, etc.) configured to provide parallel processing functionalities to allow the network management system 150 to execute multiple processes simultaneously. It is appreciated that other types of processor arrangements could be implemented that provide for the capabilities disclosed herein.

The memory 220 may be a volatile or non-volatile, magnetic, semiconductor, tape, optical, removable, non-removable, or other type of storage device or tangible or non-transitory computer-readable medium that stores one or more program(s) 230 such as server apps 232 and operating system 234, and data 240. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The network management system 150 may include one or more storage devices configured to store information used by processor 210 (or other components) to perform certain functions related to the disclosed embodiments. For example, the network management system 150 may include memory 220 that includes instructions to enable the processor 210 to execute one or more applications, such as server apps 232, operating system 234, and any other type of application or software known to be available on computer systems. Alternatively or additionally, the instructions, application programs, etc. may be stored in an external database 170 (which can also be internal to the network management system 150) or external storage communicatively coupled with the network management system 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 220 and database 170 may include one or more memory devices that store data and instructions used to perform one or more features of the disclosed embodiments. The memory 220 and database 170 may also include any combination of one or more databases controlled by memory controller devices (e.g., server(s), etc.) or software, such as document management systems, Microsoft™ SQL databases, SharePoint databases, Oracle™ databases, Sybase™ databases, or other relational databases.

In some embodiments, the network management system 150 may be communicatively connected to one or more remote memory devices (e.g., remote databases (not shown)) through network 140 or a different network. The remote memory devices can be configured to store information that the network management system 150 can access and/or manage. By way of example, the remote memory devices could be document management systems, Microsoft™ SQL database, SharePoint databases, Oracle™ databases, Sybase™ databases, or other relational databases. Systems and methods consistent with disclosed embodiments, however, are not limited to separate databases or even to the use of a database.

The programs 230 include one or more software modules configured to cause processor 210 to perform one or more functions of the disclosed embodiments. Moreover, the processor 210 may execute one or more programs located remotely from one or more components of the data communication network 100. For example, the network management system 150 may access one or more remote programs that, when executed, perform functions related to disclosed embodiments.

In the presently described embodiment, server app(s) 232 causes the processor 210 to perform one or more functions of the disclosed methods. For example, the server app(s) 232 cause the processor 210 to determine service routes and allocate resources for services to be delivered in the data communication network 100.

In some embodiments, the program(s) 230 may include the operating system 234 performing operating system functions when executed by one or more processors such as the processor 210. By way of example, the operating system 234 may include Microsoft Windows™, Unix™, Linux™, Apple™ operating systems, Personal Digital Assistant (PDA) type operating systems, such as Apple iOS™, Google Android™, Blackberry OS™, or other types of operating systems. Accordingly, disclosed embodiments may operate and function with computer systems running any type of operating system 234. The network management system 150 may also include software that, when executed by a processor, provides communications with network 140 through the network interface 260 and/or a direct connection to one or more network devices 120A-120E.

In some embodiments, the data 240 may include, for example, network configurations, requirements of service demands, routes for existing service, capacity of the network devices and each service path, and so on. For example, the data 240 may include network topology of the service network 160, capacity of the network devices 120, and capacity of the communication link between the network devices 120. The data 240 may also include requirements of service demands and resource allocation for each service in the service network 160.

The network management system 150 may also include one or more I/O devices 250 having one or more interfaces for receiving signals or input from devices and providing signals or output to one or more devices that allow data to be received and/or transmitted by the network management system 150. For example, the network management system 150 may include interface components for interfacing with one or more input devices, such as one or more keyboards, mouse devices, and the like, that enable the network management system 150 to receive input from an operator or administrator (not shown).

Migrating Service

In a data communication network, there is often a need to migrate configurations of services. For example, due to arrival of new services, resources allocated for the existing services may be changed to satisfy the demands of the new services in the network. New routes may be allocated to the existing services, and allocation of resources on a path may be reconfigured. In this disclosure, the term "path" refers to a source-destination physical or logical route (such as an A-Z path). A path can have one or more configurations, as a result of allocations of different resources, such as different wavelength assignments.

Figure 3:
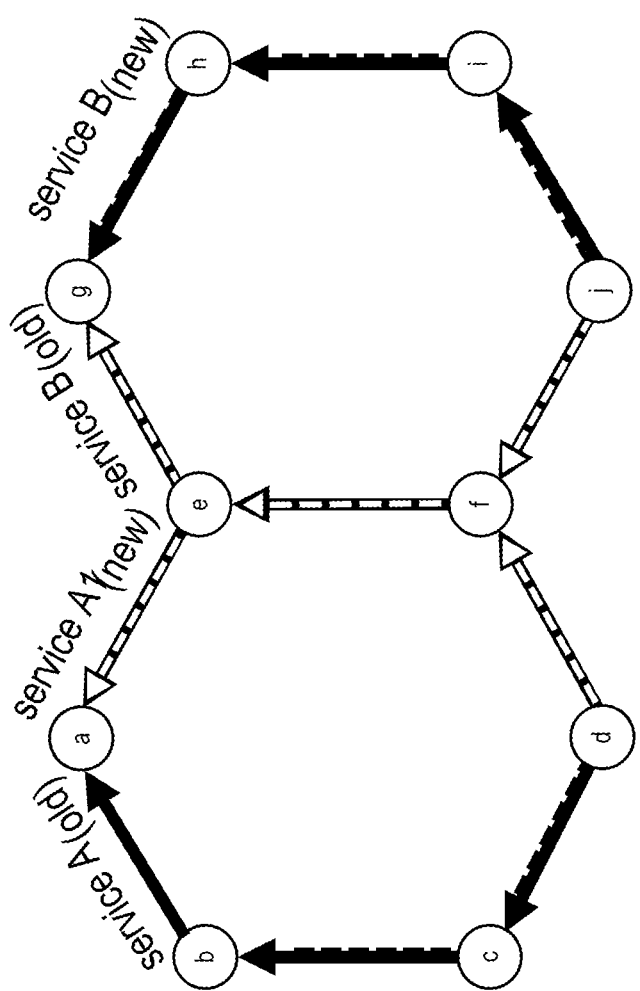
FIG. 3 is a diagram of an example service migration map, consistent with the present disclosure.

FIG. 3 is a diagram of an example service migration map 300, consistent with the present disclosure. FIG. 3 illustrates configurations for services A and B in the data communication network. In the data communication network, each service demand can be identified by a tuple <s, t>, with s and t being the source and destination node of the service demand. In this example, service A that is to be delivered from source node "d" to destination node "a" can be identified by <d, a>, and service B that is to be delivered from source node "j" to destination node "g" can be identified by <j, g>. As discussed earlier, a network node refers to a network component, such as network devices 120, that communicates with one another according to predetermined protocols by means of wired or wireless communication links.

As shown in FIG. 3, before migration, service A is routed along path d→c→b→a, and service B is routed along path j→f→e→g. After service migration, service A is rerouted to link d→f→e→a, and service B is rerouted to path j→i→h→g. Thus, the path f→e is part of the service route for service B before service migration, and is also part of the service route for service A after service migration. As the path f→e is involved in the migration of services both A and B, a migration sequence is required to minimize the service disruption. In this example, it is desired to first migrate service B to remove the service B on the path f→e, before adding service A on the path f→e to migrate service A, such that path f→e does not carry both services A and B during the migration phase. In doing so, the chance of service disruption due to the limited bandwidth on path f→e is reduced. FIG. 3 serves as an example of service migration map. One of ordinary skill in the art would appreciate that a data communication network may provide more than two services, and there may be more than one overlapping path between migrations of the services.

Figure 4:
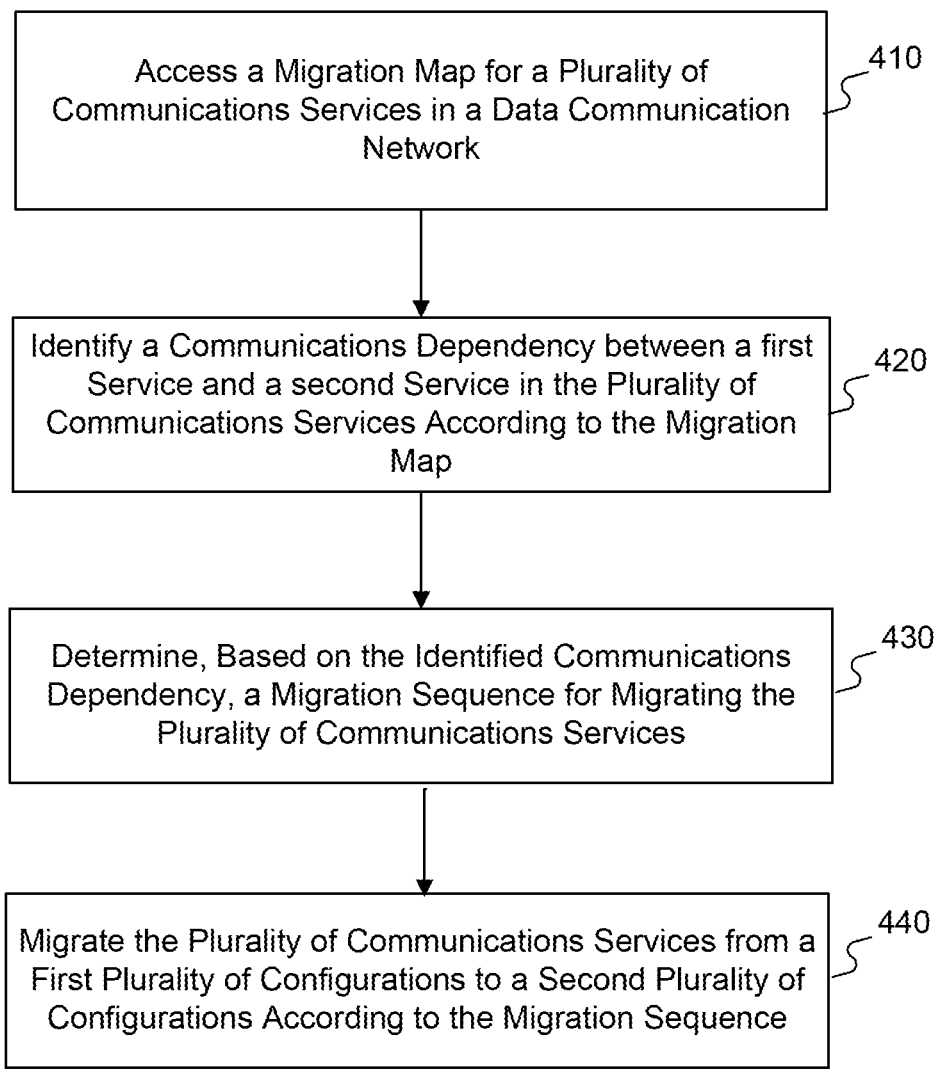
FIG. 4 is a flowchart of an example process for migrating communications services in a data communication network, in accordance with embodiments of the present disclosure.

FIG. 4 is a flowchart of an example process 400 for migrating communications services in a data communication network, in accordance with embodiments of the present disclosure. The steps associated with this example process may be performed by, for example, a processor of the network management system 150 of FIG. 1. The example process 400 allows a service provider to migrate services in a data communication network according to a certain order so as to reduce the disruption of services during the service migration.

In step 410, the network management system accesses a migration map for a plurality of communications services in a data communication network. For example, the migration map may show routes of services before and after the migration. The migration map may also identify resources allocated on paths for services, such as a wavelength configured for the service on the associated service paths. The migration map may be stored in a database connected to the network management system, such as the database 170, or stored locally in the network management system. In some embodiments, the migration map may be generated separately by a network controller based on the QoS requirements of services in the network so as to satisfy the service demands and achieve efficient use of the network. In some embodiments, the migration map may be continuously or periodically updated based on the current network status or the service demands.

In some embodiments, the network management system accesses the migration map in response to a user request to retrieve a sequence of migrations for the services. For example, the user request may be received via the I/O device 250. In other embodiments, the network management system may be configured to access the migration map periodically to identify whether a migration sequence is to be determined. In other embodiments, the network management system may access the migration map in response to receiving a notification that the migration map is updated and/or service migrations are about to occur. The notification may be received from a network controller that allocates routes and resources for services in the network.

In step 420, the network management system identifies a communications dependency between a first service and a second service in the plurality of communications services according to the migration map. For example, the migration map may identify that the first service is configured to migrate from a first route to a second route, the second service is configured to migrate from a third route to a fourth route, and the third route overlaps with the second route. Communications dependency means that a service cannot be moved to its final state (e.g., route and wavelength) until some other service occupying overlapping spans is moved out.

Figure 5:
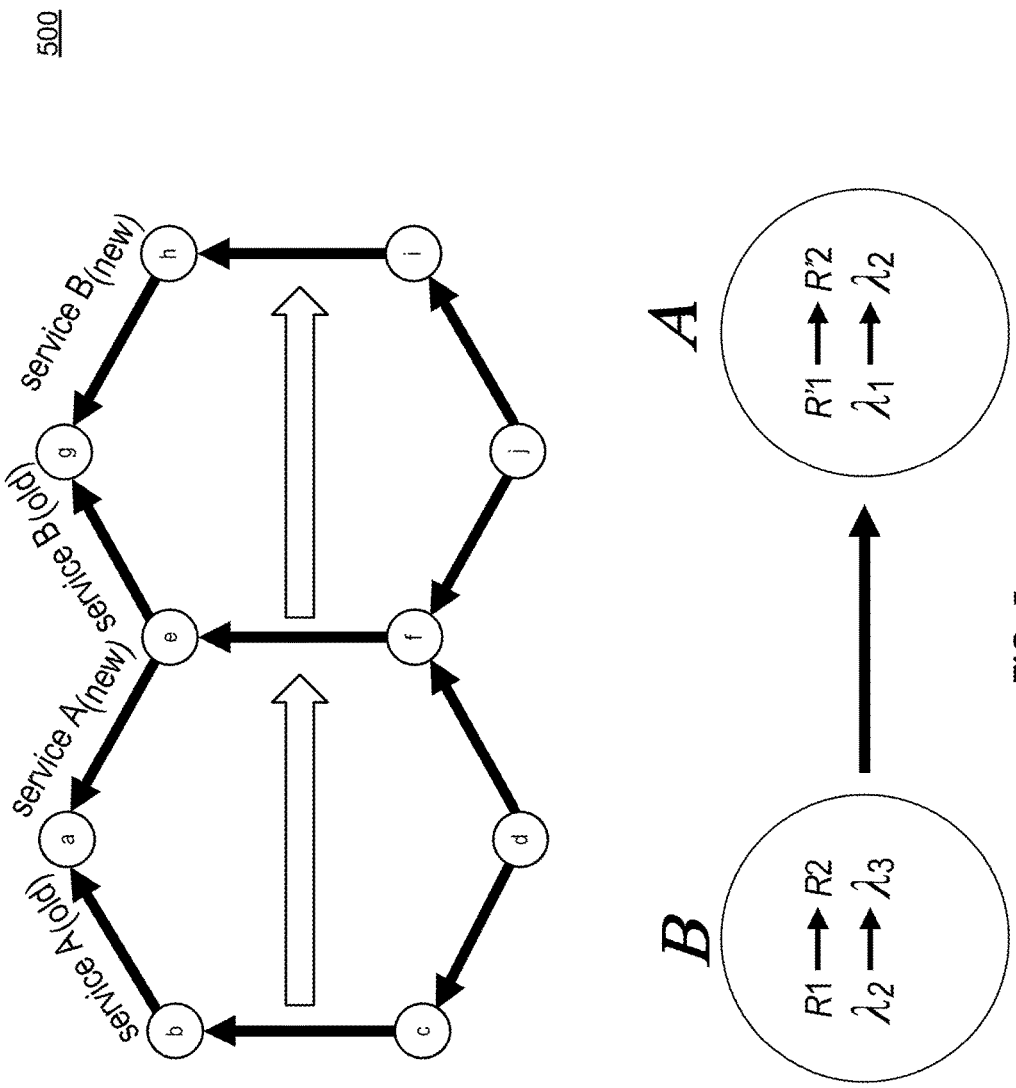
FIG. 5 is a diagram illustrating a process for constructing a dependency graph, in accordance with embodiments of the present disclosure.

FIG. 5 is a diagram illustrating a process 500 for constructing a dependency graph according to a migration map, in accordance with embodiments of the present disclosure. As shown in FIG. 5, before migration, service A is routed along route R'1: d→c→b→a, and service B is routed along route R1: j→f→e→g. After service reconfiguration, service A is rerouted to route R'2: d→f→e→a, and service B is rerouted to route R2: j→i→h→g. In this example, the data communication network is an optical network, where the wavelength assigned for service A before and after migration is $\lambda_1$ and $\lambda_2$ respectively, and the wavelength assigned for service B before and after migration is $\lambda_2$ and $\lambda_3$ respectively. Thus, route R'2 for service A overlaps with R1 for service B over the path f→e, and the wavelength assigned for service A after migration is the same as the wavelength assigned for service B before migration. In this case, a directed edge from B to A is added, as shown in FIG. 5. In this embodiment, for any two services α and β in the data communication network, a directed edge from β to α is added if an old route of β before migration overlaps a new route of α after migration. In an optical network, the wavelength assigned to an old route of β before migration equals the wavelength assigned to a new route of α after migration. In doing so, a dependency graph is constructed. The diagrams depicted in FIG. 5 are examples only and are not intended to be limiting.

Referring to FIG. 4, in step 430, the network management system determines, based on the identified communications dependency, a migration sequence for migrating the plurality of communications services in the data communication network. For example, based on the identified communications dependency between services A and B shown in FIG. 5, the network management system determines that migration of service B should occur before migration of service A. Thus, a migration sequence (B, A) can be formed, in which service B is the first to migrate in the migration sequence, and service A is the second to migrate in the migration sequence.

Figure 6:
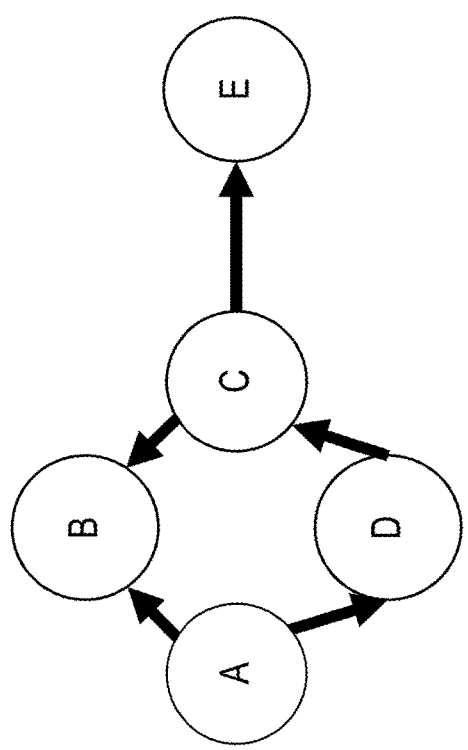
FIG. 6 is an example dependency graph, in accordance with embodiments of the present disclosure.

In some embodiments, a dependency graph may be constructed based on the identified communications dependency of service demands in the migration map. To construct a dependency graph, for each service demand, the network management system creates a node $n_i$ in the dependency graph. The network management system then creates a directed edge from node $n_i$ to node $n_j$ if an old route of node $n_i$ before migration overlaps a new route of $n_j$ after migration. In an optical network, a directed edge is created from node $n_i$ to node $n_j$ if the wavelength assigned to an old route of $n_i$ before migration equals the wavelength assigned to a new route of $n_j$ after migration. FIG. 6 is an example dependency graph 600, in accordance with embodiments of the present disclosure. The diagrams depicted in FIG. 6 are examples only and are not intended to be limiting. As shown in FIG. 6, a dependency graph is constructed including service demands A-E. For example, the dependency graph shows directed edges between services A-E, such as edges A→B, A→D, D→C, C→B, and C→E. The directed edges between the services are identified using the method described above in step 420. For example, an edge exists between services A and D and is directed from service A to service D, meaning that an old route of A before migration overlaps a new route of D after migration. In an optical network, the directed edge from service A to service D also means that the wavelength assigned to an old route of A before migration equals the wavelength assigned to a new route of D after migration.

In some embodiments, based on the dependency graph, a migration sequence for services can be acquired according to a topological sort of nodes in the dependency graph. For example, according to the dependency graph shown in FIG. 6, a migration sequence (A, D, C, B, E) can be formed, with service A being the first to migrate in the migration sequence and service E being the last to migrate in the migration sequence. The migration sequence allows the service demands in the network to be migrated smoothly with minimal service disruption.

Referring to FIG. 4, in step 440, the network management system migrates the plurality of communications services from a first plurality of configurations to a second plurality of configurations according to the migration sequence. The configurations for services may include a selected route and/or a wavelength assignment for each service demand. For example, each of the services A-E shown in FIG. 6 may be migrated to a different route according to the order identified in the migration sequence (A, D, C, B, E). Different resources, such as bandwidth, wavelength, time slots, may also be allocated for each of the services after the migration. For example, in an optical network, each of the services A-E shown in FIG. 6 may also be migrated to a different wavelength. By migrating the services according to the migration sequence, the dependency relation among the migrations of service is considered, thereby reducing the service disruption caused by the migration.

In some embodiments, parallel processing can be performed to reduce the time to migrate the services. For example, the network management system may identify the vertices of the dependency graph that have no in-going edges and group them together. The group of vertices may be added to the end of the migration sequence, where migrations of communications services corresponding to the group of vertices can be performed in parallel. The network management system may then delete the group of vertices from the dependency graph and repeat the above steps until no more vertices remain in the dependency graph.

Figure 7:
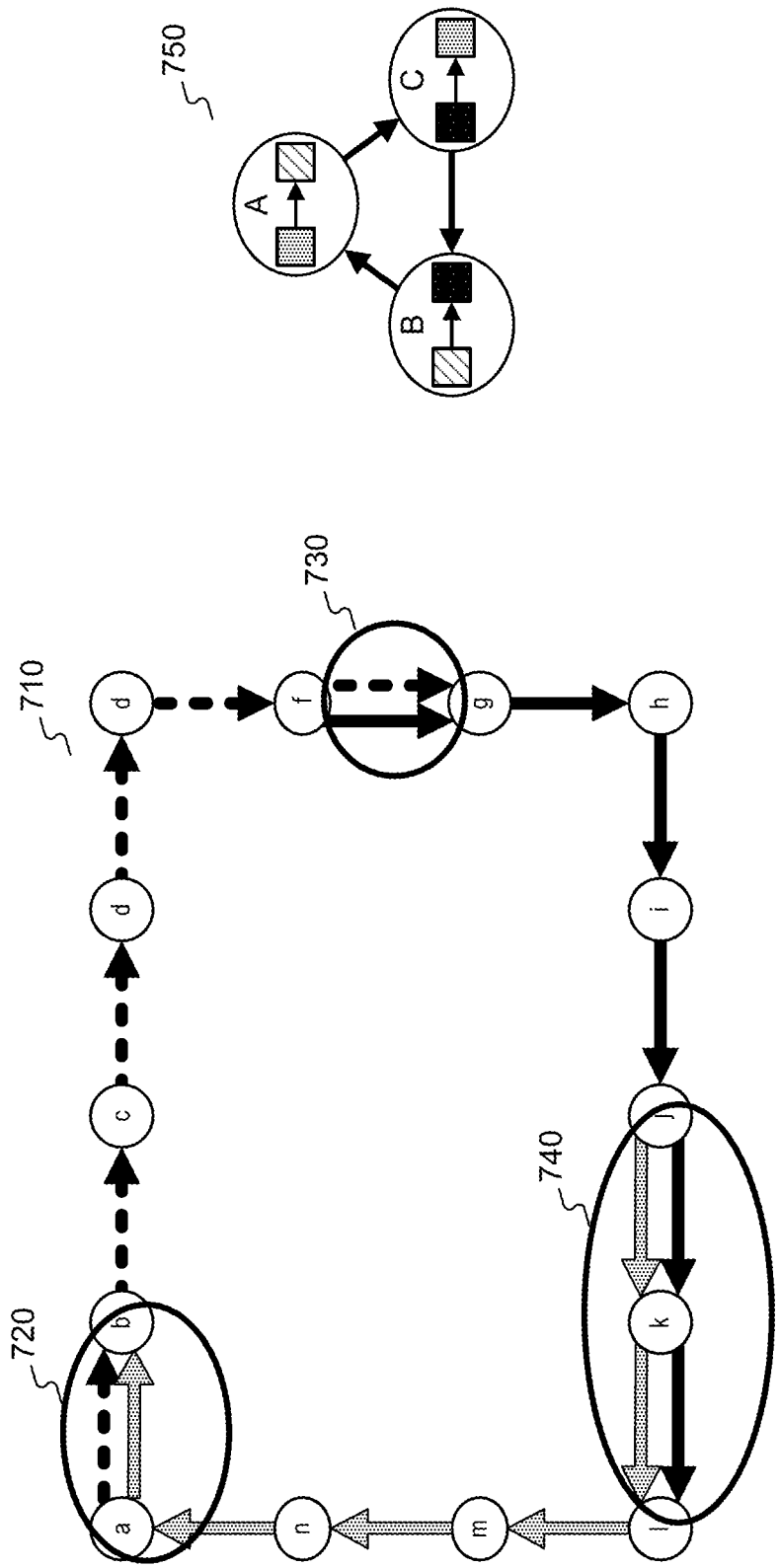
FIG. 7 is a diagram illustrating a dependency cycle, in accordance with embodiments of the present disclosure.

In some data communication networks, the dependency graph may include one or more cycles, where a dependency cycle starts and ends on the same service, making it difficult to determine the migration sequence based on the dependency graph. FIG. 7 is a diagram illustrating a dependency cycle in a data communication network, in accordance with embodiments of the present disclosure. The example diagram depicted in FIG. 7 is an example only and is not intended to be limiting.

As shown in FIG. 7, the left diagram illustrates a network graph 710 including nodes a-n and connectivity between the nodes a-n. Services A, B, C are provided by the network, where service A<j, b> is from source node "j" to destination node "b", service B<a, g> is from source node "a" to destination node "g", and service C<f, l> is from source node "f" to destination node "1". As shown in FIG. 7, path 720, a→b, is an overlapping path between service A and service B, path 730, f→g, is an overlapping path between service B and service C, and path 740, j→l, is an overlapping path between service A and service C. In this example, service A is to be migrated to another wavelength that is the same as an wavelength configuration for service B before migration of service B, service B is to be migrated to another wavelength that is the same as an wavelength configuration for service C before migration of service C, and service C is to be migrated to another wavelength that is the same as an wavelength configuration for service A before migration of service A. As a result, a cycle is formed in the corresponding dependency graph 750, with directed edges from service B to service A, service C to service B, and service A to service C. The dependency cycle presents a deadlock condition such that it is difficult to determine the migration sequence of services A, B, C based on the dependency graph 750. For example, if a migration sequence (A, C, B) is used, service A cannot migrate to the new wavelength without first migrating service C out of its old wavelength, causing a disruption of service A.

Figure 8:
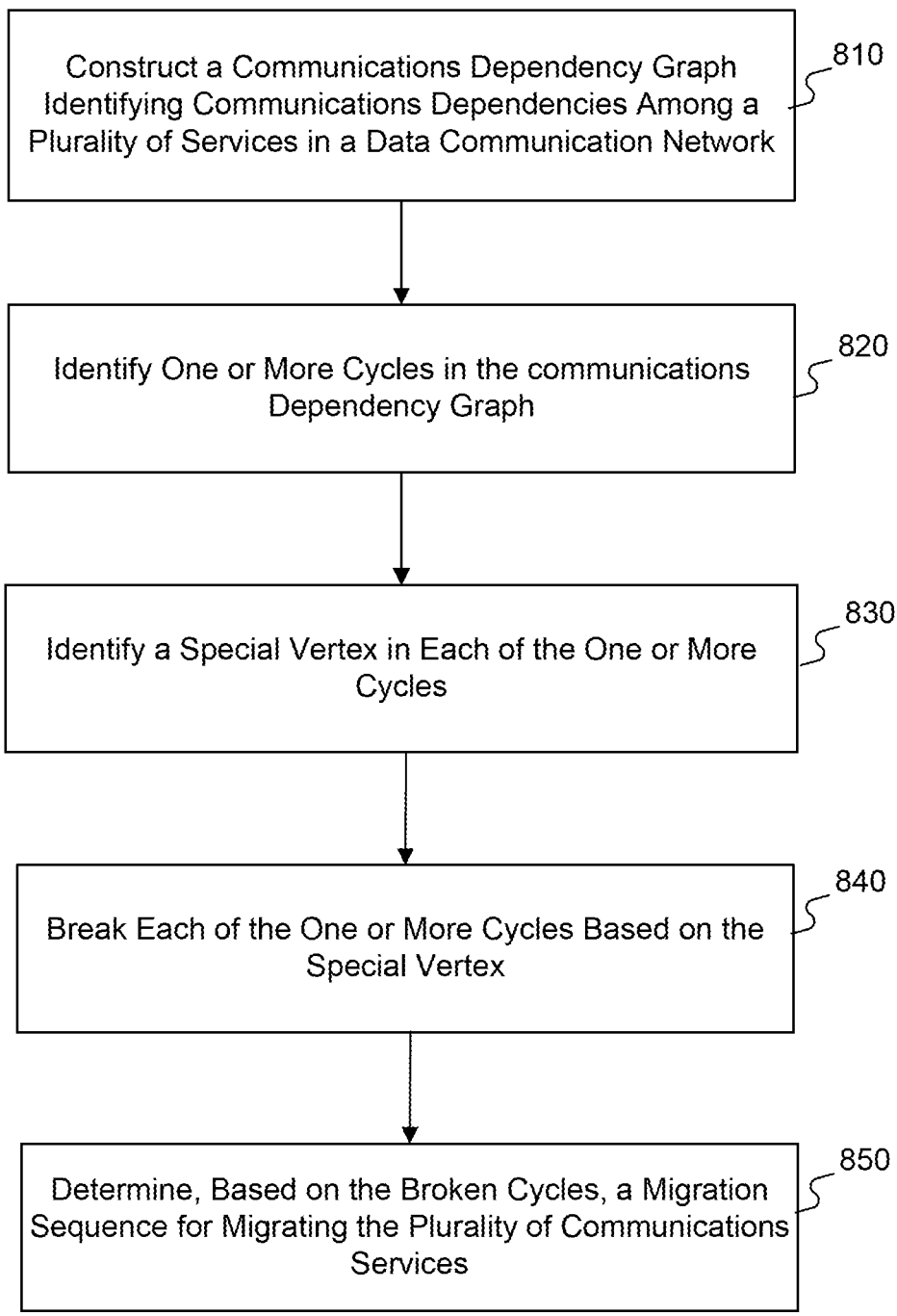
FIG. 8 is a flowchart of an example process for migrating communications services in a data communication network, consistent with the disclosed embodiments.

FIG. 8 is a flowchart of an example process 800 for migrating communications services in a data communication network, consistent with the disclosed embodiments. The steps associated with this example process may be performed by, for example, a processor of the network management system 150 of FIG. 1. The example process 800 provides a method to migrate services in a data communication network when there are one or more cycles in the dependency graph of the services.

In step 810, the network management system constructs a communications dependency graph identifying communications dependencies among a plurality of services in a data communication network. For example, the method described above in connection with FIGS. 4 and 5 can be used to construct the communications dependency graph. The communications dependency graph includes a plurality of vertices, each of the plurality of vertices corresponding to a pre-migration configuration and a post-migration configuration of a service in the data communication network. In this disclosure, the terms "node" and "vertex" may be used interchangeably. For each service demand $d_i$ in the data communication network, a corresponding node $n_i$ is created in the communications dependency graph. A directed edge from node $n_i$ to node $n_j$ is created in the communications dependency graph if the current pre-migration route of service $d_i$ overlaps with the final post-migration route of service $d_j$ in the migration map. In an optical network, to create a directed edge from node $n_i$ to node $n_j$, it is also required that the current pre-migration wavelength assignment of service $d_i$ be the same as the final post-migration wavelength assignment of service $d_j$.

In step 820, the network management system identifies one or more cycles in the communications dependency graph. For example, like the cycle 750 shown in FIG. 7, each of the cycles may include at least three vertices corresponding to at least three services in the plurality of communications services. In some implementations, the network management system may look for a cycle that starts and ends on the same vertex to detect the cycle. If no cycle is detected in the dependency graph, the network management system may determine a migration sequence according to the method described in connection with FIG. 4.

In step 830, the network management system identifies a special vertex in each of the one or more cycles. For example, the network management system may identify node A in the dependency cycle 750 of FIG. 7 as a special vertex. As another example, the network management system may identify node B in the dependency cycle 750 of FIG. 7 as a special vertex. In some embodiments, a node corresponding to a service that can be delivered using a temporary wavelength different from the pre-migration wavelength and post-migration wavelength may be selected as the special vertex. The process 800 does not limit how a special vertex is chosen in a dependency cycle.

Figure 9:
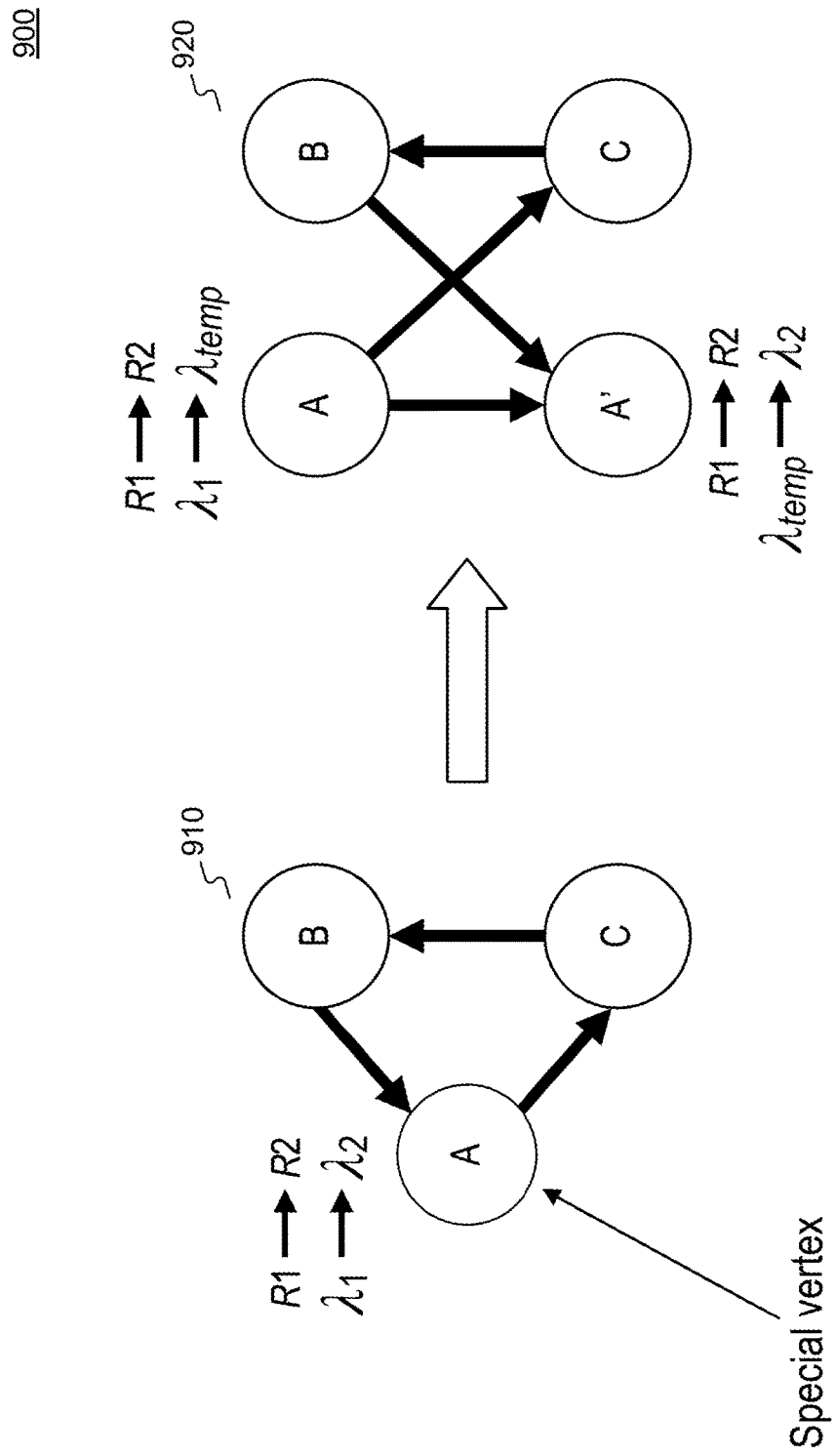
FIG. 9 is a diagram illustrating a process for breaking a dependency cycle, in accordance with embodiments of the present disclosure.

In step 840, the network management system breaks each of the one or more cycles based on the special vertex. FIG. 9 is a diagram illustrating a process 900 for breaking a dependency cycle, in accordance with embodiments of the present disclosure. As shown in the left diagram of FIG. 9, node A in the dependency cycle 910 is identified as the special vertex, where node A corresponds to service A with a pre-migration configuration of route $R_1$ with wavelength $\lambda_1$ and a post-migration configuration of route $R_2$ with wavelength $\lambda_2$. After identifying the special vertex, a temporary wavelength may be used to break the dependency cycle 910. As shown in the right diagram of FIG. 9, node A is first migrated to a temporary wavelength $\lambda_{temp}$, and an additional node A' may be added to the dependency graph. The additional node A' corresponds to a pre-migration configuration of route $R_1$ with wavelength $\lambda_{temp}$ and a post-migration configuration of route $R_2$ with wavelength $\lambda_2$. A directed edge from A to A' may also be added in the acyclic dependency graph 920. In doing so, the dependency cycle is broken into an acyclic dependency graph 920, and a migration sequence may be determined based on the acyclic dependency graph 920. When the dependency graph includes multiple cycles, each of the cycles can be broken into an acyclic dependency graph using the above-described process.

In step 850, the network management system determines, based on the broken cycles, a migration sequence for migrating the plurality of communications services. For example, after the dependency cycle 910 in the left diagram of FIG. 9 is broken into the acyclic dependency graph 920, a migration sequence (A, C, B, A') may be determined according to the topological sort of the acyclic dependency graph 920. In the migration sequence (A C B A'), service A is moved twice, the first time being migrated to a temporary wavelength and the second time being migrated to the final post-migration route and wavelength of service A. By using the temporary wavelength to break the dependency cycle and determine a migration sequence, the deadlock condition of the dependency cycle is resolved, and the services can transit to the post-migration configurations smoothly with minimal service disruption.

Data Structure for Path Restoration

In a data communication network, when a network link failure occurs, restoration paths will need to be provided for services affected by the network link failure. Computing the restoration paths may be complex in a large network, and the computation may be performed at a central server which distributes the restoration paths to the network devices via configuration instructions. The configuration instructions may have a large size to include restoration paths for all possible link failures and link failure combinations. The disclosed embodiments provide a data structure that can be computed at a central service and sent to the network devices. The network devices may then compute the restoration paths using the data structure to satisfy the service demands when a network link failure occurs.

Figure 10:
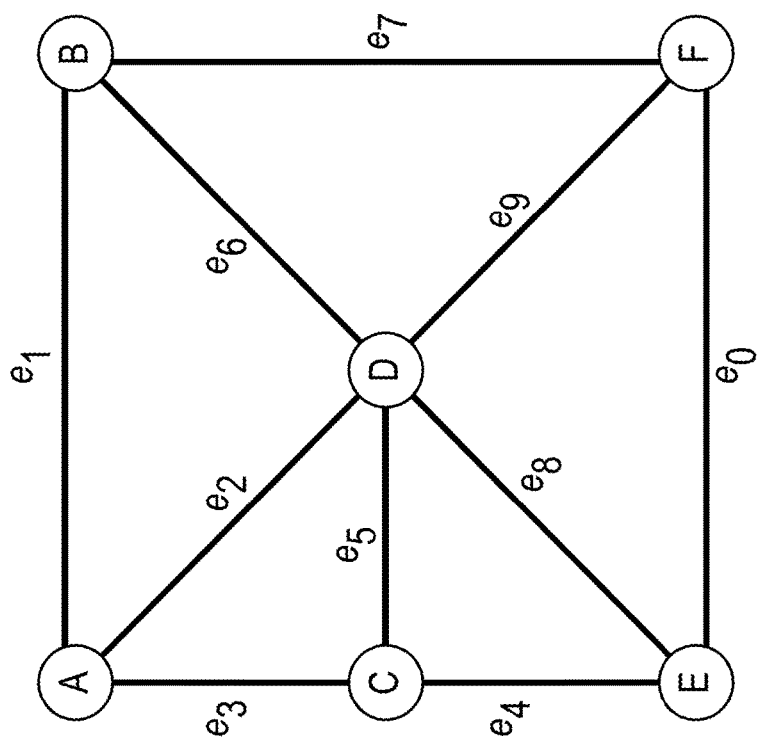
FIG. 10 is a diagram illustrating a network graph in a data communication network, in accordance with embodiments of the present disclosure.

FIG. 10 is a diagram illustrating a network graph 1000 in a data communication network, in accordance with embodiments of the present disclosure. As shown in FIG. 10, the network graph 1000 contains network nodes $\{A, B, C, D, E, F\}$. The direct connection between two nodes is referred to as an edge, such as the connection between (A, B). As shown in FIG. 10, the network graph 1000 includes 10 edges $\{e_0, \ldots, e_9\}$, i.e., the connections between nodes (E, F), (A, B), (A, D), (A, C), (C, E), (C, D), (B, D), (B, F), (D, E), (D, F), respectively. If any of the edges $\{e_0, \ldots, e_9\}$ fails, a service that currently routes through the failed edge will need to be rerouted to avoid the failed edge. In some circumstances, there could be failures with multiple edges in the network, and restoration paths will need to be provided for services that routes though any of the failed edges to avoid any of the failed edges.

In this example, six service links $\{r_1, \ldots, r_6\}$ are provided to satisfy the service demands, where each service link is a path in the network graph 1000. In this disclosure, a path of a service link refers to a series of service paths in which an end vertex of a service path is the beginning vertex of a next service path. For example, Table 1 shows paths of service links $\{r_1, \ldots, r_6\}$.

TABLE 1

Paths of Service Links

| Service Link | Path of Service Link |
| --- | --- |
| $r_1$ | $\{e_2\}$ |
| $r_2$ | $\{e_9\}$ |
| $r_3$ | $\{e_6, e_7\}$ |
| $r_4$ | $\{e_3, e_5\}$ |
| $r_5$ | $\{e_1, e_6, e_8\}$ |
| $r_6$ | $\{e_0\}$ |

A path of a service link satisfies a service demand <x, y> if the beginning vertex of the first service path is x and the end vertex of the last service path is y. For example, as shown in FIG. 10, service link $r_4$ consists of a path through nodes (A, C, D), and service link $r_5$ consists of a path through nodes (A, B, D, E).

In this example, there is a service demand <A, F> in the network, which may be satisfied by service path $(r_1, r_2)$. If any of the edges among $\{e_0, \ldots, e\}$ fail, a restoration path may need to be found for service demand <A, F>. For example, if edge $e_1$ fails, no restoration path is needed. In the event of a link failure in edge $e_2$, as the current service path $(r_1, r_2)$ routes though $e_2$, a restoration path not routing through $e_2$, such as service path $(r_4, r_2)$, will need to be found to satisfy the service demand. In the event of a link failure in edge $e_9$, as the current service path $(r_1, r_2)$ routes though $e_9$, a restoration path not routing through $e_9$, such as service path $(r_1, r_3)$, will need to be found to satisfy the service demand. In the event of link failures in both edges $e_2$ and $e_9$ occur, a restoration path not routing through $e_2$ or $e_9$, such as service path $(r_5, r_6)$, will need to be found to satisfy the service demand. For a large network with a large number of service demands, the number of restoration paths that need to be pre-computed can be large. As a result, it could take a large amount of storage space in the central server and network devices to store the restoration paths given the possible link failures in different edges or edge combinations. The disclosed embodiments provide a method to identify the restoration paths without having to store all the paths for each service demand and each series of link failures.

Figure 11:
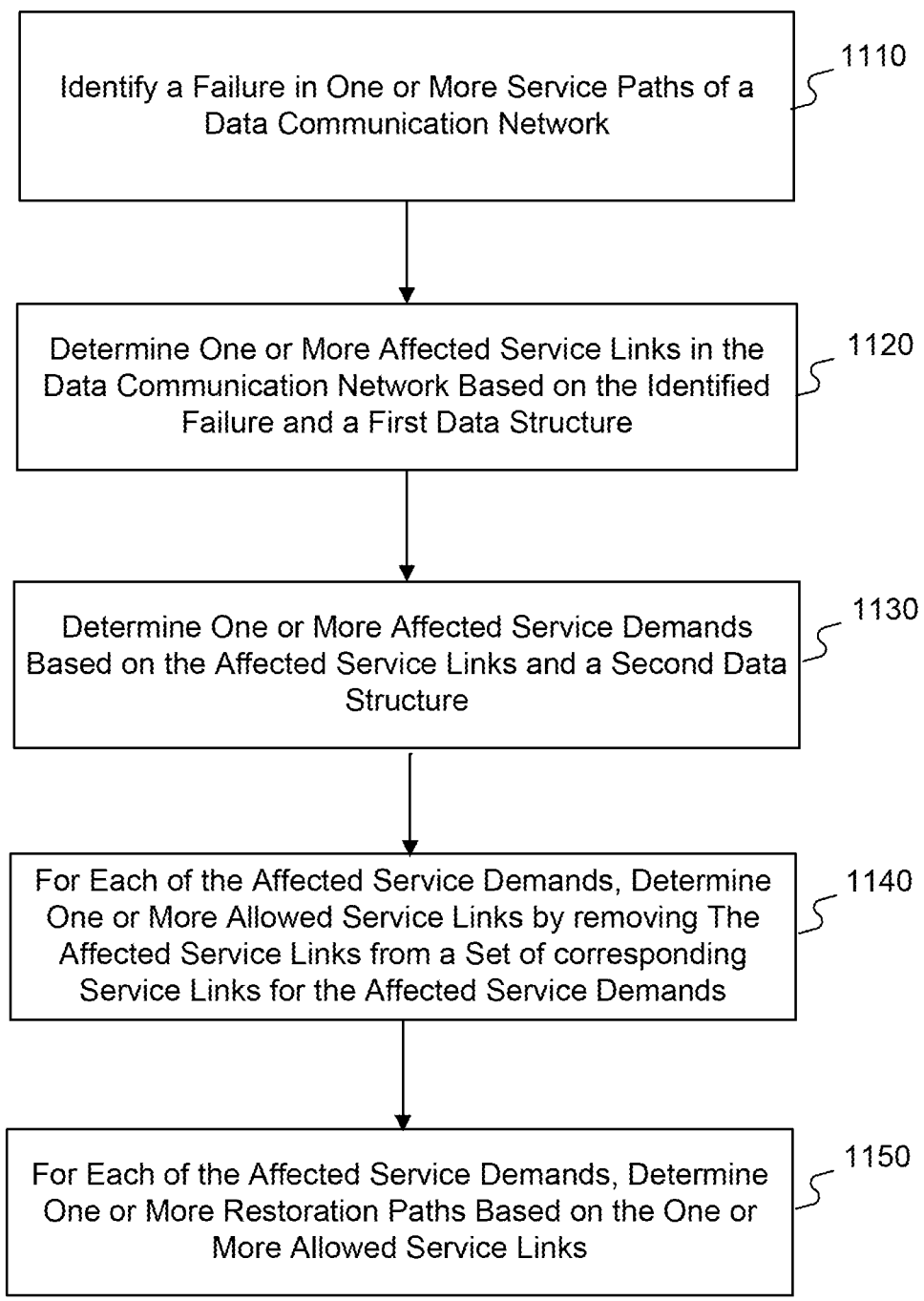
FIG. 11 is a flowchart of an example process for providing restoration paths in a data communication network, consistent with the disclosed embodiments.

FIG. 11 is a flowchart of an example process 1100 for providing restoration paths in a data communication network, consistent with the disclosed embodiments. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network. The example process 1100 allows a network device or a network management system to provide restoration paths in a data communication network without having to store all the paths for each service demand and each series of link failures.

In step 1110, the network management system identifies a failure in one or more service paths of the data communication network. For example, the network management system may identify a link failure by detecting service degradation in one or more services currently provided by the data communication network. As another example, the network management system may identify a link failure by receiving feedback from network devices indicating a failure to send or receive data by the network devices. Other methods known by one of ordinary skill in the art may be used to identify a failure in one or more service paths of the data communication network, which are not describe herein for the sake of brevity.

Figure 12:
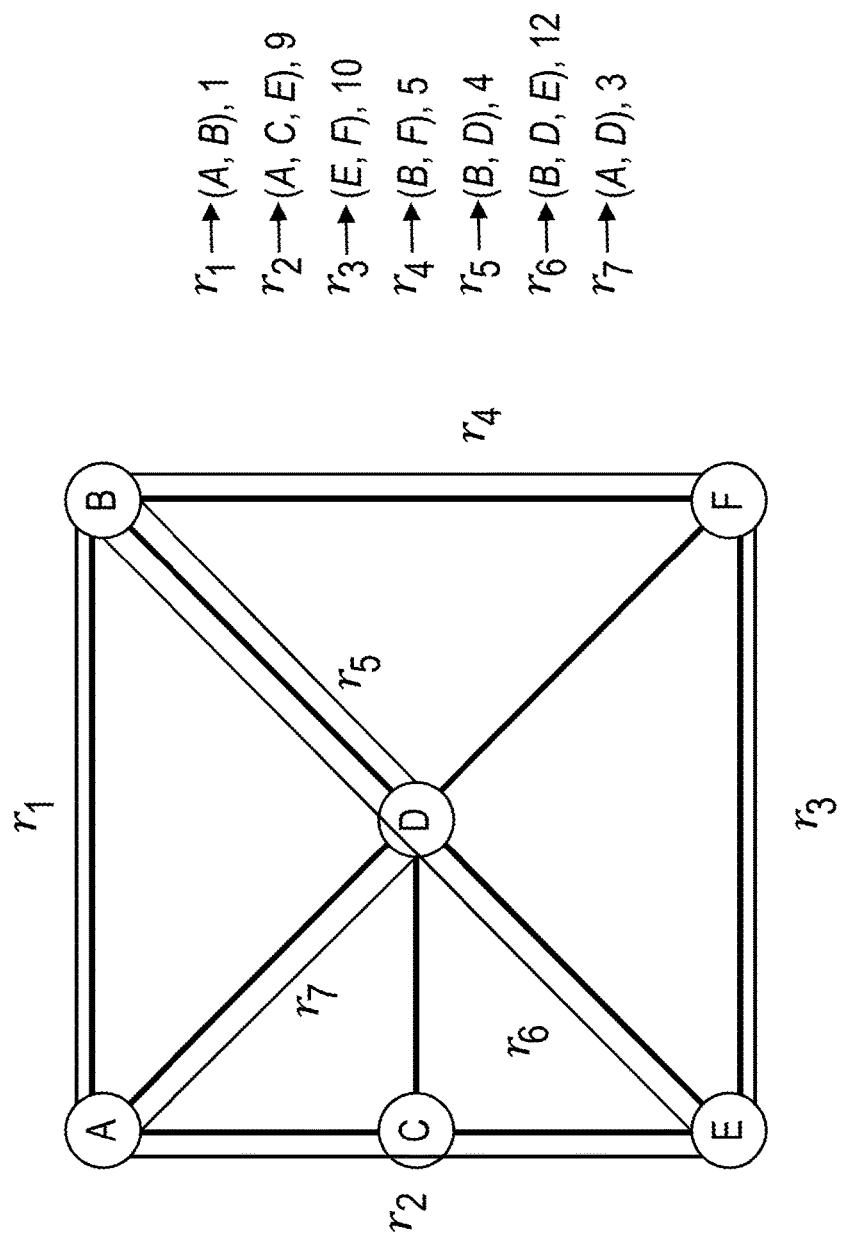
FIG. 12 is a diagram illustrating another network graph in a data communication network, in accordance with embodiments of the present disclosure.

In step 1120, the network management system determines one or more affected service links in the data communication network based on the identified failure and a first data structure. In some embodiments, the first data structure includes a plurality of service paths and one or more corresponding service links that use the service path. FIG. 12 is a diagram illustrating another network graph 1200 in a data communication network, in accordance with embodiments of the present disclosure. As shown in FIG. 12, there are seven service links $\{r_1, \ldots, r_7\}$ provided by the data communication network, where each service link consists of one or more service paths. The service links $\{r_1, \ldots, r_7\}$ that can be used to satisfy service demands and their corresponding metrics are provided in Table 2. The metric indicates a cost associated with the service links and may be additive in service links that includes two or more edges.

TABLE 2

Example Service Links in a Network

| Service Links | Service Path | Metric |
| --- | --- | --- |
| $r_1$ | (A, B) | 1 |
| $r_2$ | (A, C, E) | 9 |

TABLE 2-continued

Example Service Links in a Network

| Service Links | Service Path | Metric |
|---|---|---|
| $r_3$ | (E, F) | 10 |
| $r_4$ | (B, F) | 5 |
| $r_5$ | (B, D) | 4 |
| $r_6$ | (B, D, E) | 12 |
| $r_7$ | (A, D) | 3 |

The first data structure may include each of the service paths, such as each edge in the network graph, and the corresponding service link that use the path, as shown in Table 3. Here, a path (x, y) represents the path between node x and node y.

TABLE 3

Example First Data Structure

| Service Path | Corresponding Service Links |
|---|---|
| (A, B) | {$r_1$} |
| (A, C) | {$r_2$} |
| (A, D) | {$r_7$} |
| (B, D) | {$r_5$, $r_6$} |
| (B, F) | {$r_4$} |
| (C, D) | N/A |
| (C, E) | {$r_2$} |
| (D, E) | {$r_6$} |
| (D, F) | N/A |
| (E, F) | {$r_3$} |

As shown in Table 3 above, in this example network, the first data structure includes each edge of the network graph and the corresponding service links that uses the edge. For example, for the edge (A, B), the only service link that uses edge (A, B) is $r_1$, and for the edge (B, D), both service links $r_5$ and $r_6$ use edge (B, D). Using the first data structure, the network management system can determine the affected service links in the data communication network when one or more service paths of the network, i.e., edges of the network graph, fail to operate properly. For example, in the event edge (B, D) fails, it can be determined that the affected service links include $r_5$ and $r_6$ using the first data structure in Table 3.

In step 1130, the network management system determines one or more affected service demands based on the affected service links and a second data structure. In some embodiments, the second data structure includes a plurality of service links provided by the data communication network and one or more service demands corresponding to one or more of the service links. The one or more service demands in the second data structure require service delivered from a first service node to a second service node, and corresponding service links can be used to satisfy the corresponding service demands. Table 4 provides an example of the second data structure for the network graph 1200 shown in FIG. 12.

TABLE 4

Example Second Data Structure

| Service Link | Corresponding Service Demands |
|---|---|
| $r_1$ | <A, B> |
| $r_2$ | <E, D> |
| $r_3$ | N/A |
| $r_4$ | <A, F> |
| $r_5$ | <A, F> |

TABLE 4-continued

Example Second Data Structure

| Service Link | Corresponding Service Demands |
|---|---|
| $r_6$ | N/A |
| $r_7$ | <A, F>, <E, D> |

As shown in Table 4 above, in this example network, service links $r_1$, $r_2$, $r_4$, and $r_5$ each are used by one corresponding service demand, service links $r_3$ and $r_6$ are not used by any service demand, and service link $r_7$ is used by two service demands. Using the second data structure, the network management system can determine the affected service demands in the data communication network when one or more service links of the network are affected because of a failure in one or more network paths.

In step 1140, the network management system, for each of the affected service demands, determines one or more allowed service links by removing the affected service links from a set of corresponding service links for the affected service demands. In some embodiments, the network management system constructs a network graph including a plurality of service nodes and one or more service links for each of the affected service demands, where the affected service links are excluded from the network graph. Using this network graph, the allowed service links for the affected service demands may be determined. For example, referring to FIG. 12, in the event service link $r_2$ and service demand <E, D> are affected, the network management system may create a new network graph by removing service link $r_2$ from the network graph 1200, so as to determine the allowed service links for service demand <E, D>.

In some embodiments, the network management system may determine the allowed service links for the affected service demands based on a third data structure. The third data structure includes a plurality of service demands and a corresponding set of service links that can be used by the service demand. In some implementations, the third data structure may be predefined by a network server. Table 5 provides an example of the third data structure for the network graph 1200 shown in FIG. 12.

TABLE 5

Example Third Data Structure

| Service Demands | Corresponding Service Links |
|---|---|
| <A, B> | {$r_1$, $r_2$, $r_5$, $r_6$, $r_7$} |
| <E, D> | {$r_2$, $r_3$, $r_4$, $r_5$, $r_6$, $r_7$} |
| <A, F> | {$r_2$, $r_3$, $r_4$, $r_5$, $r_7$} |

As shown in Table 5, a number of service links are allowed for each of the service demands. For example, referring to FIG. 12, in the event service link $r_2$ and service demand <E, D> are affected, the network management system may remove $r_2$ from the corresponding set of service links in the third data structure and determine that the allowed service links for service demand <E, D> are {$r_3$, $r_4$, $r_5$, $r_6$, $r_7$}.

In step 1150, the network management system for each of the affected service demands, determines one or more restoration paths based on the one or more allowed service links. In some embodiments, the restoration paths are determined based on a fourth data structure. The fourth data structure includes the service links provided by the data communication network, one or more corresponding service paths, and a corresponding cost metric. For example, Table 2 described above may be a fourth data structure for the network illustrated in FIG. 12. In some embodiments, the restoration paths are determined by using a Dijkstra's algorithm. For example, the network management system may construct another network graph based on the allowed service links identified in step 1140 and using information in the fourth data structure. The network management system may then run the Dijkstra's algorithm on the constructed network graph to determine the restoration paths for the affected service demands. One of ordinary skill in the art would understand that Dijkstra's algorithm is an algorithm for finding the shortest paths between nodes in a graph, and the details of the Dijkstra's algorithm are not provided in this disclosure. Methods known to one of ordinary skill in the art to implement the Dijkstra's algorithm can be used to identify restoration paths for the affected service demands.

By using the first and second data structures, the example process 1100 allows the restoration paths to be determined in real time when a network link failure occurs. Moreover, the size of the first and second data structures are relatively small, and so it does not take much storage space to store the first and second data structures. This also allows the data structures to be stored in the network devices. In some embodiments, the first, second, third, and fourth data structures are stored in the network devices. Further, because constructing a new network graph and running the Dijkstra's algorithm are computationally efficient, the network devices may be able to determine the restoration paths in a distributed manner rather than relying on a network management system or a server to determine the restoration paths.

Figure 13:
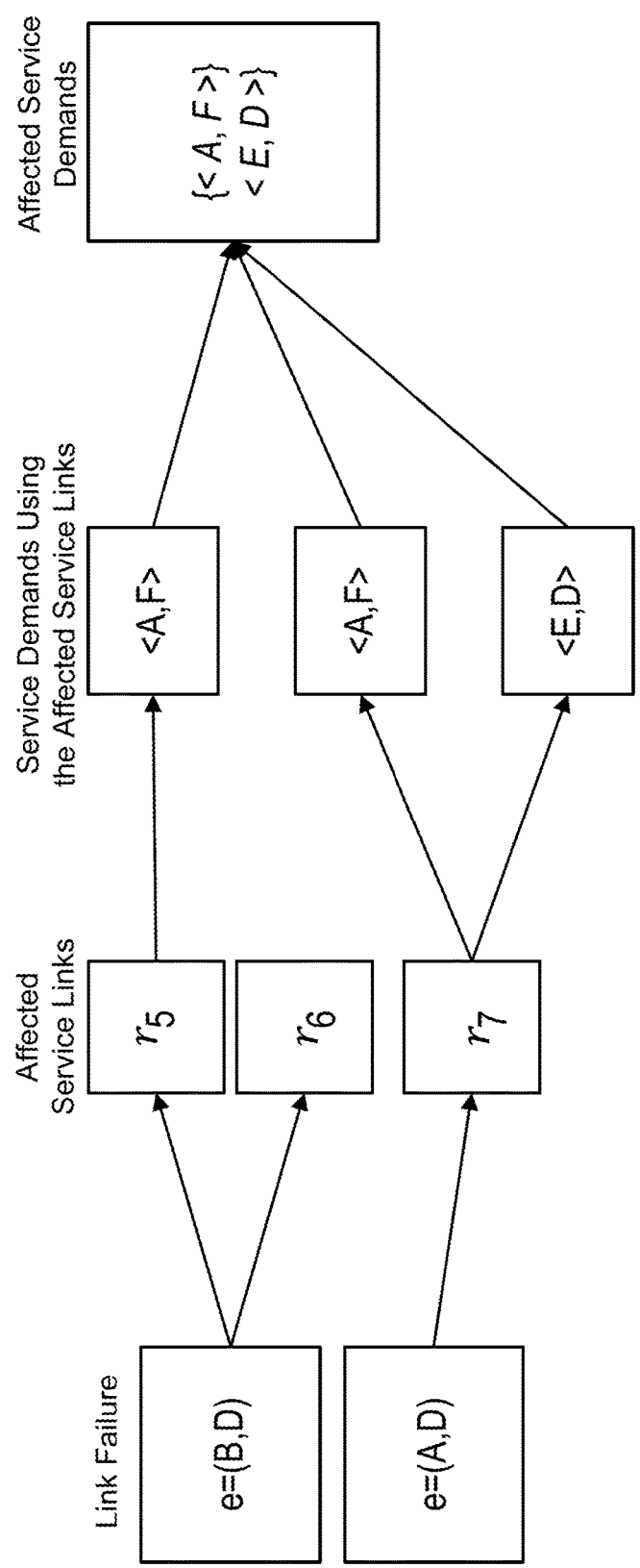
FIG. 13 is a diagram illustrating an example process for identifying affected service demands when one or more service paths in a data communication network fail, in accordance with embodiments of the present disclosure.

FIG. 13 is a diagram illustrating an example process 1300 for identifying affected service demands when one or more service paths in a data communication network fail, in accordance with embodiments of the present disclosure. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network.

In this example, the network graph 1200 in FIG. 12 is used as the graph in the data communication network, and a link failure in edges (B, D) and (A, D) is identified. Thus, restoration paths need to be provided for service demands affected by the link failure. As shown in FIG. 13, after the link failure is identified, the network management system determines service links that are affected by the identified failure. The network management system may use the first data structure shown in Table 3 above to identify the affected service links. As shown in Table 3, service links $r_5$ and $r_6$ are affected by the failure of edge (B, D), and service link $r_7$ is affected by the failure of edge (A, D). Then service demands that use the affected service links may be determined using the second data structure shown in Table 4 above. According to Table 4, service demand <A, F> is affected by the affected service link $r_5$, service demands <A, F> and <E, D> are affected by the affected service link $r_7$, and no service demand is affected by the affected service link $r_6$. Thus, the set of service demands that are affected by the link failure includes service demands <A, F> and <E, D>. The network management system then needs to determine restoration paths for rerouting the affected service demands.

Figure 14:
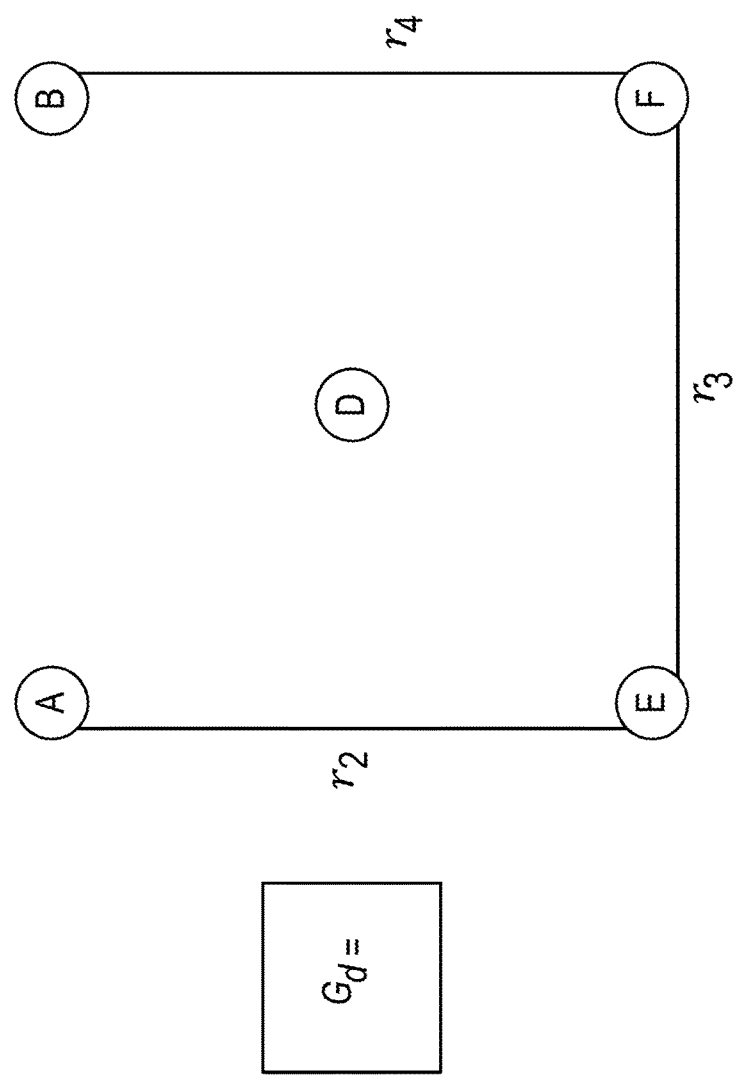
FIG. 14 is a diagram illustrating another network graph for identifying restoration paths for affected service demands in a data communication network, in accordance with embodiments of the present disclosure.

FIG. 14 is a diagram illustrating another network graph 1400 for identifying restoration paths for affected service demands in a data communication network, in accordance with embodiments of the present disclosure. As shown in FIG. 14, the network management system constructs another network graph 1400 for the affected service demand <A, F> by removing the affected service links $r_5$, $r_6$, and $r_7$ from the original network graph 1200 before the link failure occurs. Because service link $r_1$ is not included in the allowed service links for service demand <A, F> identified in the third data structure of Table 5, $r_1$ is also removed from the network graph 1200. As a result, the network graph 1400 contains service links $r_2$, $r_3$, and $r_4$. Because node C is not an end point for any of the allowed service links for service demand <A, F>, node C is also removed from the network graph 1200, and the network graph 1400 contains nodes A, B, D, E, F. Based on the network graph 1400, the network management system may run the Dijkstra's algorithm and determine that the path ($r_2$, $r_3$) may be used as the restoration path for service demand <A, F>. One of ordinary skill would understand that similar processing can be performed to identify the restoration path for the other affected service demand <E, D>. Further, one of ordinary skill would understand that the network graphs 1200 and 1400 are described herein for illustrative purposes, and the disclosed embodiments can be used to identify restoration paths for different network graphs and service demands provided in the network.

Cycle Structure for Path Restoration

In a data communication network, when a network link failure occurs, restoration paths need to be provided for services affected by the network link failure. Given a set of demands in the data communication network, it is desirable to assign service links to the service demands such that when one or two edges fail, the service demands can still be satisfied. For example, referring to the third data structure in Table 5 above, it is desirable to assign the service links to the service demands <A, B>, <E, D>, and <A, F> such that when one or two edges fail, and as a result, the relevant assigned service links fail, the service demands can be satisfied using the remaining available service links. The disclosed embodiments provide a cycle structure that can be used to assign the service links to the service demands such that when one or two assigned service links fail, the service demands can still be satisfied using the remaining available service links.

Figure 15:
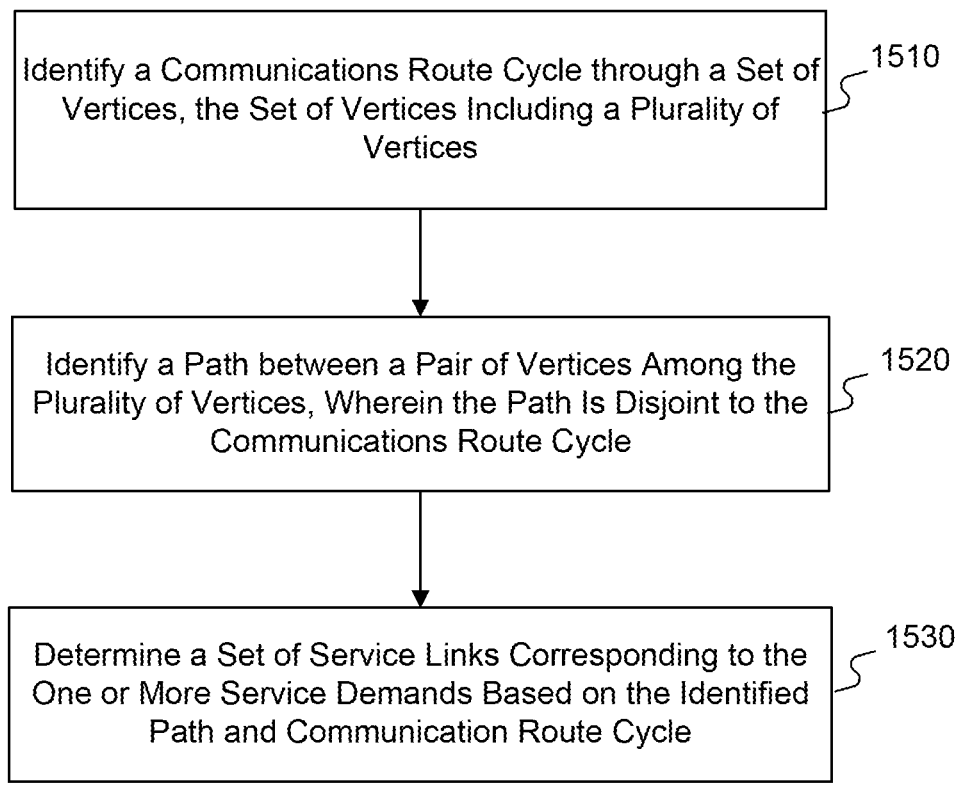
FIG. 15 is a flowchart of an example process for restoring service demands in a data communication network, consistent with the disclosed embodiments.

FIG. 15 is a flowchart of an example process 1500 for restoring service demands in a data communication network, consistent with the disclosed embodiments. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network. The example process 1500 allows service demands to be restored by using remaining available service links when one or two service links assigned to the service demands fail.

In step 1510, the network management system identifies a communications route cycle through a set of vertices. The set of vertices includes a plurality of vertices, each of the plurality of vertices corresponding to an end point of at least one service demand. The plurality of vertices includes two vertices corresponding to end points of each of the service demands. In this disclosure, a vertex corresponds to a network node, such as a network device 120, and the terms "vertex" and "node" may be used interchangeably.

Figure 16:
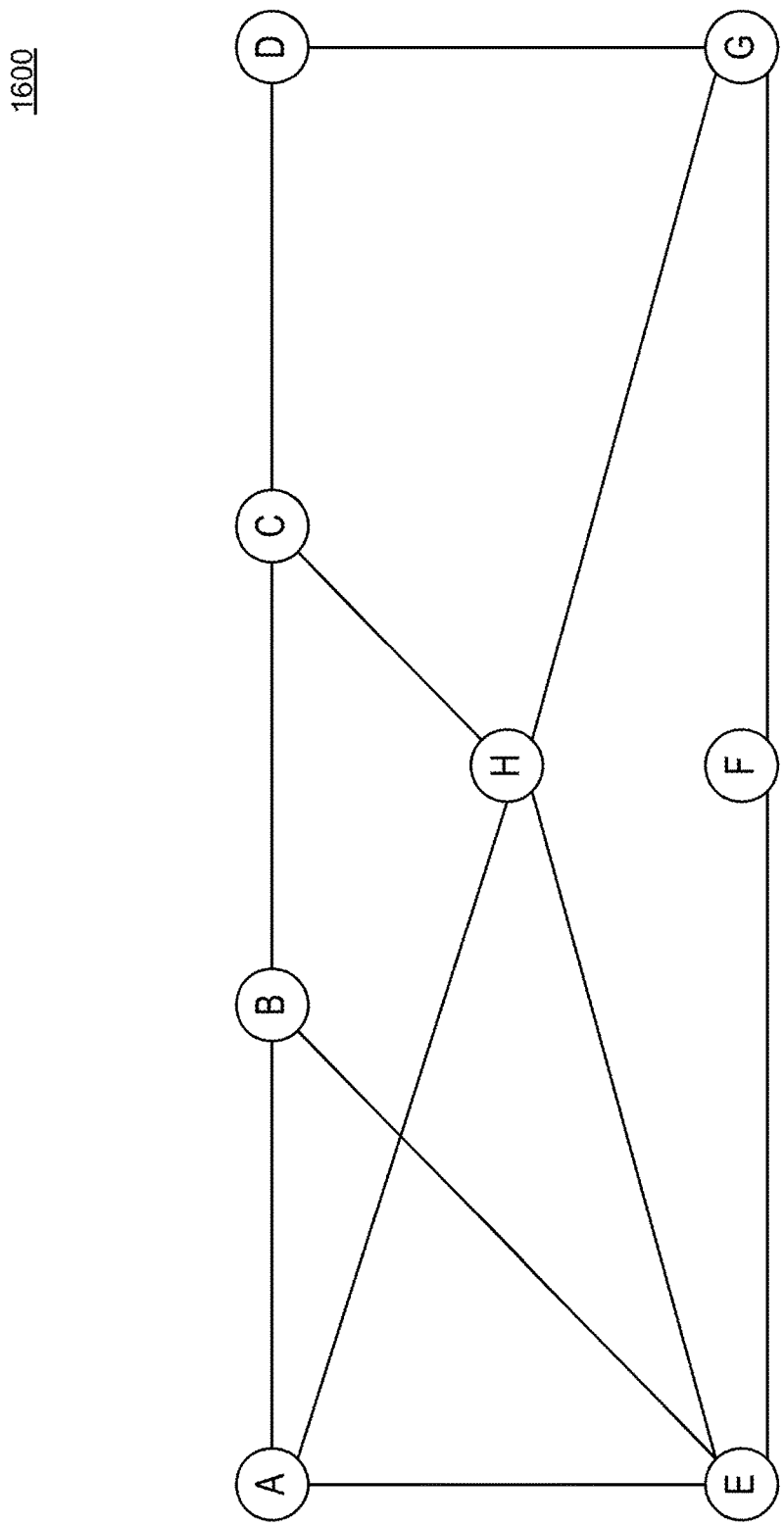
FIG. 16 is a diagram illustrating a communications route cycle in a data communication network, in accordance with embodiments of the present disclosure.

FIG. 16 is a diagram illustrating a communications route cycle 1600 in a data communication network, in accordance with embodiments of the present disclosure. The communications route cycle 1600 is a part of a path cycle. A path cycle refers to a cycle combined with the additional paths that are disjoint to the edges of the cycle. In this example, the service demands in the data communication network include <A, C>, <B, E> <E, G>, and one or more service links are to be assigned to each of the service demands. As shown in FIG. 16, the communications route cycle 1600 includes vertices A, B, C, E, G, which are end points, i.e., source nodes or destination nodes, of the service demands <A, C>, <B, E>, <E, G>. The communications route cycle 1600 also includes vertices D, F, H that are not end points of a demand. As shown in FIG. 16, the communications route cycle 1600 consists of a cycle {A, B, C, D, G, F, E, A} that goes through the vertices that are end points A, B, C, E, G of the service demands <A, C>, <B, E>, <E, G> and vertices D, F that are not end points of a demand. One of ordinary skill in the art will understand that the communications route cycle 1600 illustrated in FIG. 16 is an example of a communications route cycle, and a communications route cycle may be different from this example without departing from the scope of the present disclosure.

In step 1520, the network management system identifies a path between a pair of vertices among the plurality of vertices, the pair of vertices corresponding to end points of a service demand, where the path is disjoint to the communications route cycle. In some embodiments, the identified path is identified based on it being the shortest among paths between the pair of vertices that are-disjoint to edges of the communications route cycle. In other embodiments, the identified path is identified based on it having the least cost among paths between the pair of vertices that are disjoint to the edges of the communications route cycle.

Referring to FIG. 16, the network management system may identify a path between any pair of end points of service demands <A, C>, <B, E>, <E, G>. For example, the network management system may identify the path A→H→C that is disjoint to the edges of the communications route cycle 1600 for service demand <A, C>. The network management system may further identify the path B→E for service demand <B, E> that is disjoint to the communications route cycle 1600 and the path E→H→G for service demand <E, G> that is disjoint to the edges of the communications route cycle 1600. As a result, a path that is disjoint to the communications route cycle 1600 is identified for each of the service demands <A, C>, <B, E>, <E, G>.

In step 1530, the network management system determines a set of service links corresponding to the one or more service demands based on the identified path and communication route cycle. In some embodiments, the set of service links includes the identified path for the corresponding service demand. Continuing with the example communications route cycle 1600 illustrated in FIG. 16, the network management system may assign service links {A→B→C, A→E→F→G→D→C, A→H→C} to service demand <A, C>. With this assignment, when any two edges fail in the communications route cycle 1600, the service demand <A, C> can still be satisfied with other available service links assigned to the service demand <A, C>. As another example, the network management system may assign service links {B→A→E, B→C→D→G→F→E, B→E} to service demand <B, E>, such that when any two edges fail in the communications route cycle 1600, the service demand <B, E> can still be satisfied with other available service links assigned to the service demand <B, E>. As a further example, the network management system may assign service links {E→F→G, E→A→B→C→D→G, E→H→G} to service demand <E, G>, such that when any two edges fail in the communications route cycle 1600, the service demand <E, G> can still be satisfied with other available service links assigned to the service demand <E, G>.

In some embodiments, the network management system may assign sets of service links for the service demands by solving the service demands together as a set. For example, the network management system may determine a first set of service links on the communications route cycle that terminate at end points of the set of demands in the data communication network. The network management system may assign the first set of service links to every demand. For example, referring to FIG. 16, the network management system may identify a first set of service links {A→B, B→C, C→D→G, G→F→E, E→A} for service demands <A, C>, <B, E>, <E, G>. Each of the service links A→B, B→C, C→D→G, G→F→E, and E→A is on the communications route cycle 1600 and terminates at end points of service demands <A, C>, <B, E>, or <E, G>. The service links {A→B, B→C, C→D→G, G→F→E, E→A} are assigned to each of the service demands <A, C>, <B, E>, <E, G>. The network management system may additionally assign the disjoint path with the same end points as the service demand to the corresponding service demand. For example, the network management system may assign an additional service link A→H→C for service demand <A, C>, an additional service link B→E for service demand <B, E>, and an additional service link E→H→G for service demand <E, G>. That is, the service links assigned for service demand <A, C> are {A→B, B→C, C→D→G, G→F→E, E→A, A→H→C}, the service links assigned for service demand <B, E> are {A→B, B→C, C→D→G, G→F→E, E→A, B→E}, and the service links assigned for service demand <E, G> are {A→B, B→C, C→D→G, G→F→E, E→A, E→H→G}. By assigning a first set of service links for the set of service demands in the data communication network jointly, the total number of service links needed for the service demands may be reduced compared to assigning service links for each of the service demands separately as illustrated above.

In some embodiments, the network management system may first identify a communications route cycle that is the shortest among all cycles going through all end points of the given service demands. For each service demand, the network management system may then identify a path that is shortest among all paths between the end points of the service demand that are disjoint to the edges of the communications route cycle. In other embodiments, the network management system may first identify a communications route cycle that is of the least cost among all cycles going through all end points of the given service demands. For each service demand, the network management system may then identify a path that is of the least cost among all paths between the end points of the service demand that are disjoint to the edges of the communications route cycle.

Figure 17:
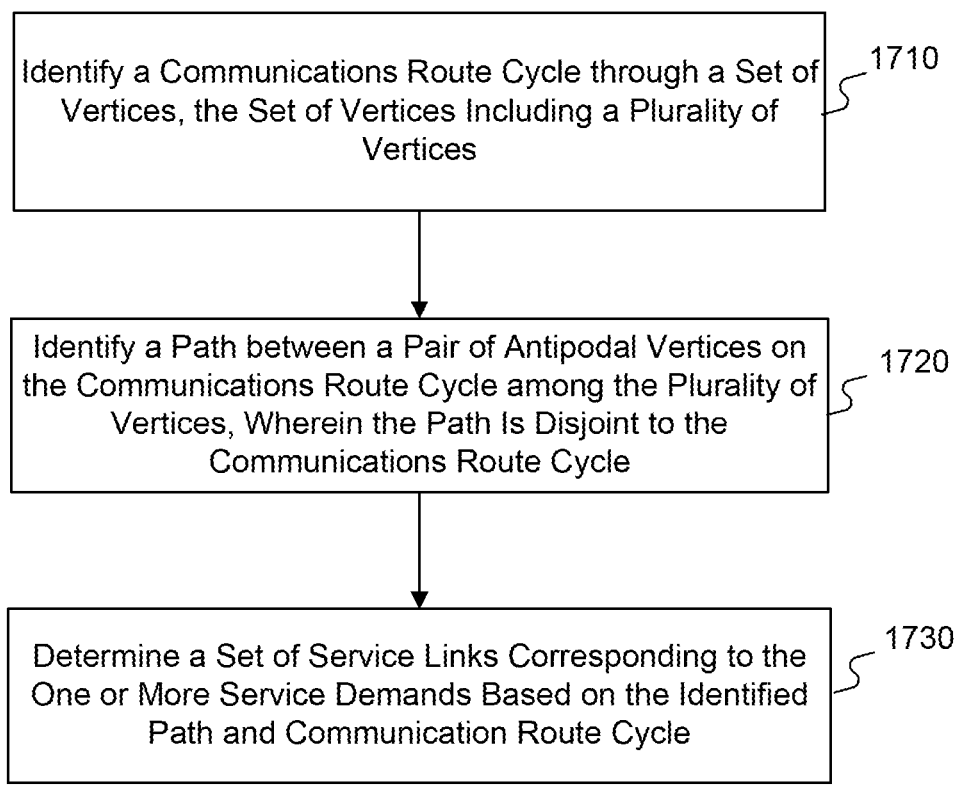
FIG. 17 is a flowchart of another example process for restoring service demands in a data communication network, consistent with the disclosed embodiments.

FIG. 17 is a flowchart of another example process 1700 for restoring service demands in a data communication network, consistent with the disclosed embodiments. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network. The example process 1500 allows service demands to be restored by using remaining available service links when one or two edges fail and cause the resulting service links assigned to the service demands fail.

In step 1710, the network management system identifies a communications route cycle through a set of vertices. The set of vertices includes a plurality of vertices, each of the plurality of vertices corresponding to an end point (i.e., a source or destination node) of at least one service demand. The plurality of vertices includes two vertices corresponding to end points of each of the service demands.

Figure 18:
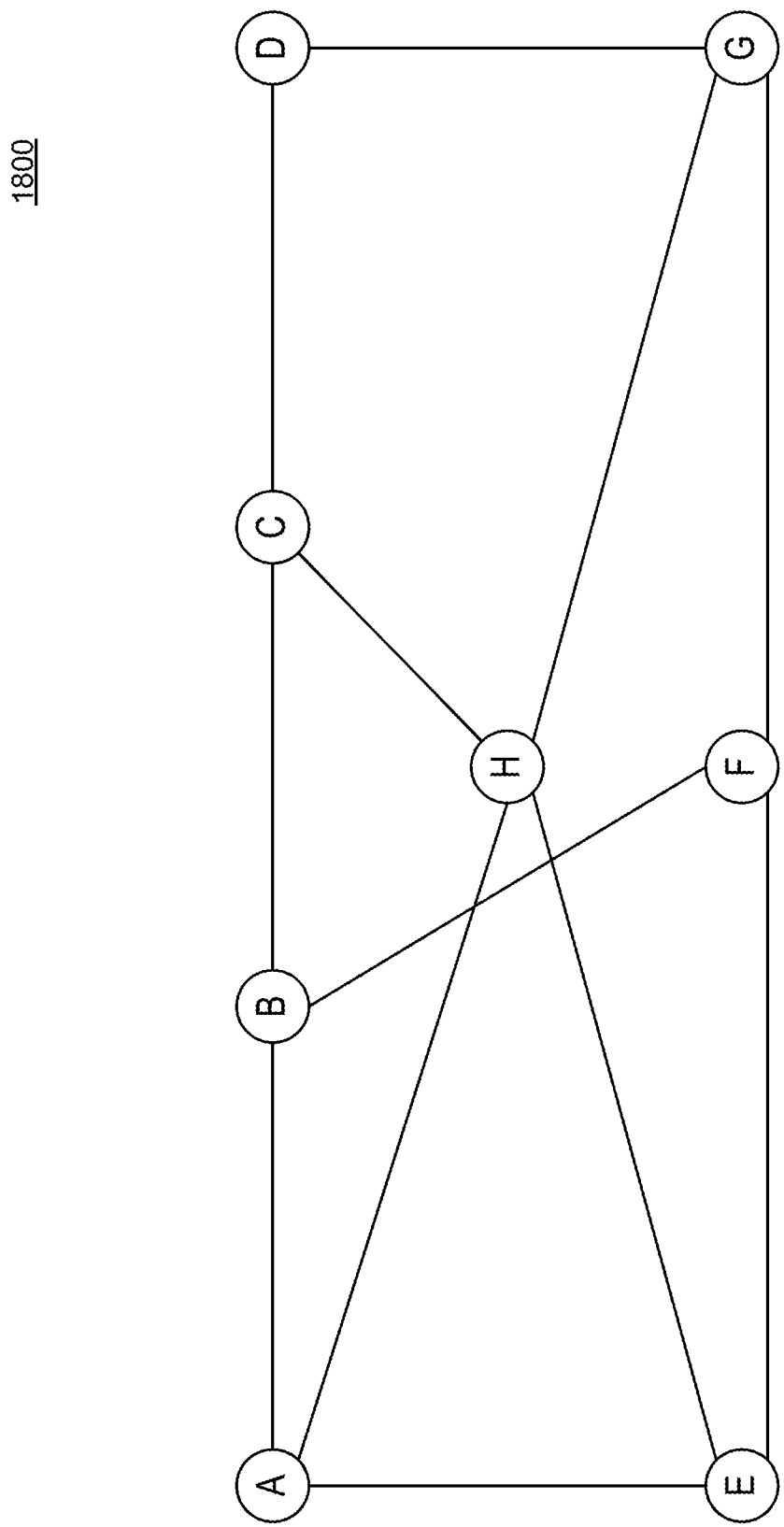
FIG. 18 is a diagram illustrating another communications route cycle in a data communication network, in accordance with embodiments of the present disclosure.

FIG. 18 is a diagram illustrating another communications route cycle 1800 in a data communication network, in accordance with embodiments of the present disclosure. The communications route cycle 1800 may also be referred to as a star cycle. In this example, the set of service demands in the data communication network includes <A, B>, <B, E>, <A, F>, <E, G>, <A, C, <C, E>, <F, G>, <B, G>. One or more service links are to be assigned to each of the service demands. As shown in FIG. 18, the communications route cycle 1800 includes vertices A, B, C, E, F, G, which are end points, i.e., source nodes or destination nodes, of the set of service demands. The communications route cycle 1800 also includes vertex D that is not an end point of a demand. As shown in FIG. 18, the communications route cycle 1800 consists of a cycle {A, B, C, D, G, F, E, A} that goes through the end points of the set of service demands A, B, C, E, F, G. One of ordinary skill in the art will understand that the communications route cycle 1800 illustrated in FIG. 18 is an example of a communications route cycle, and a communications route cycle may be different from this example without departing from the scope of the present disclosure.

In step 1720, the network management system identifies a path between a pair of antipodal vertices on the communications route cycle among the plurality of vertices, where the path is disjoint to the edges of the communications route cycle. In some embodiments, the identified path is identified based on it being the shortest among paths between the pair of antipodal vertices that are disjoint to the communications route cycle. In other embodiments, the identified path is identified based on it having the least cost among paths between the pair of antipodal vertices that are disjoint to the edges of the communications route cycle.

Referring to FIG. 18, the network management system may identify pairs of antipodal vertices including (A, G), (B, F), and (C, E). The network management system may then identify paths between the pairs of antipodal vertices that are disjoint to the communications route cycle 1800. For example, the network management system may identify the path A→H→G that is disjoint to the edges of the communications route cycle 1800 between the antipodal vertices (A, G). The network management system may further identify the path B→F for the antipodal vertices (B, F) that is disjoint to the edges of the communications route cycle 1800 and the path C→H→E for the antipodal vertices (C, E) that is disjoint to the edges of the communications route cycle 1800. As a result, a path that is disjoint to the communications route cycle 1800 is identified for each of the pairs of antipodal vertices.

In step 1730, the network management system determines a set of service links corresponding to the set of one or more service demands based on the identified path and communication route cycle. In some embodiments, the set of service links includes a service link that contains the identified path for the corresponding antipodal vertices. Continuing with the example communications route cycle 1800 illustrated in FIG. 18, the network management system may assign service links {A→B, B→C, C→D→G, G→F, F→E, E→A, A→H→G, C→H→E, B→F} to service demand <A, B>. With this assignment, when any two edges fail in the communications route cycle 1800, the service demand <A, B> can still be satisfied with other available service links assigned to the service demand <A, B>. As another example, the network management system may assign the same service links {A→B, B→C, C→D→G, G→F, F→E, E→A, A→H→G, C→H→E, B→F} to service demand <B, E>, such that when any two edges fail in the communications route cycle 1800, the service demand <B, E> can still be satisfied with other available service links assigned to the service demand <B, E>. As a further example, the network management system may assign the same service links {A→B, B→C, C→D→G, G→F, F→E, E→A, A→H→G, C→H→E, B→F} to service demand <E, G>, such that when any two edges fail in the communications route cycle 1800, the service demand <E, G> can still be satisfied with other available service links assigned to the service demand <E, G>.

In some embodiments, the network management system may first identify a communications route cycle that is the shortest among all cycles going through all end points of the given service demands. The network management system may then identify pairs of antipodal vertices in the communications route cycle. For each pair of antipodal vertices, the network management system may then identify a path that is shortest among all paths between the pair of antipodal vertices that are disjoint to the edges of the communications route cycle.

In other embodiments, the network management system may first identify a communications route cycle that is of the least cost among all cycles going through all end points of the given service demands. The network management system may then identify pairs of antipodal vertices in the communications route cycle. For each pair of antipodal vertices, the network management system may then identify a path that is of the least cost among all paths the pair of antipodal vertices that are disjoint to the edges of the communications route cycle.

In some implementations, the network management system may identify both a path cycle, i.e., a communications route cycle that includes disjoint paths to the edges of the cycle between end points of service demands, and a star cycle, i.e., a communications route cycle that includes disjoint paths to the edges of the cycle between antipodal nodes of the cycle, for a given set of service demands. The network management system may determine which cycle would lead to a shorter path for the service links corresponding to the service demands and use that cycle to determine the service links.

Service Link Grooming

In a data communication network, there may be a large number of service demands to be satisfied. It is required to provide service links to satisfy the service demands, and in the meantime, it is desired to reduce the service links to satisfy the service demands to the extent possible. The disclosed embodiments provide a method for determining sets of service demands from a plurality of service demands based on connected components in the network graph. The service links to be provided for satisfying the plurality of service demands are then determined based on the sets of service demands by using a set cover algorithm.

Figure 19:
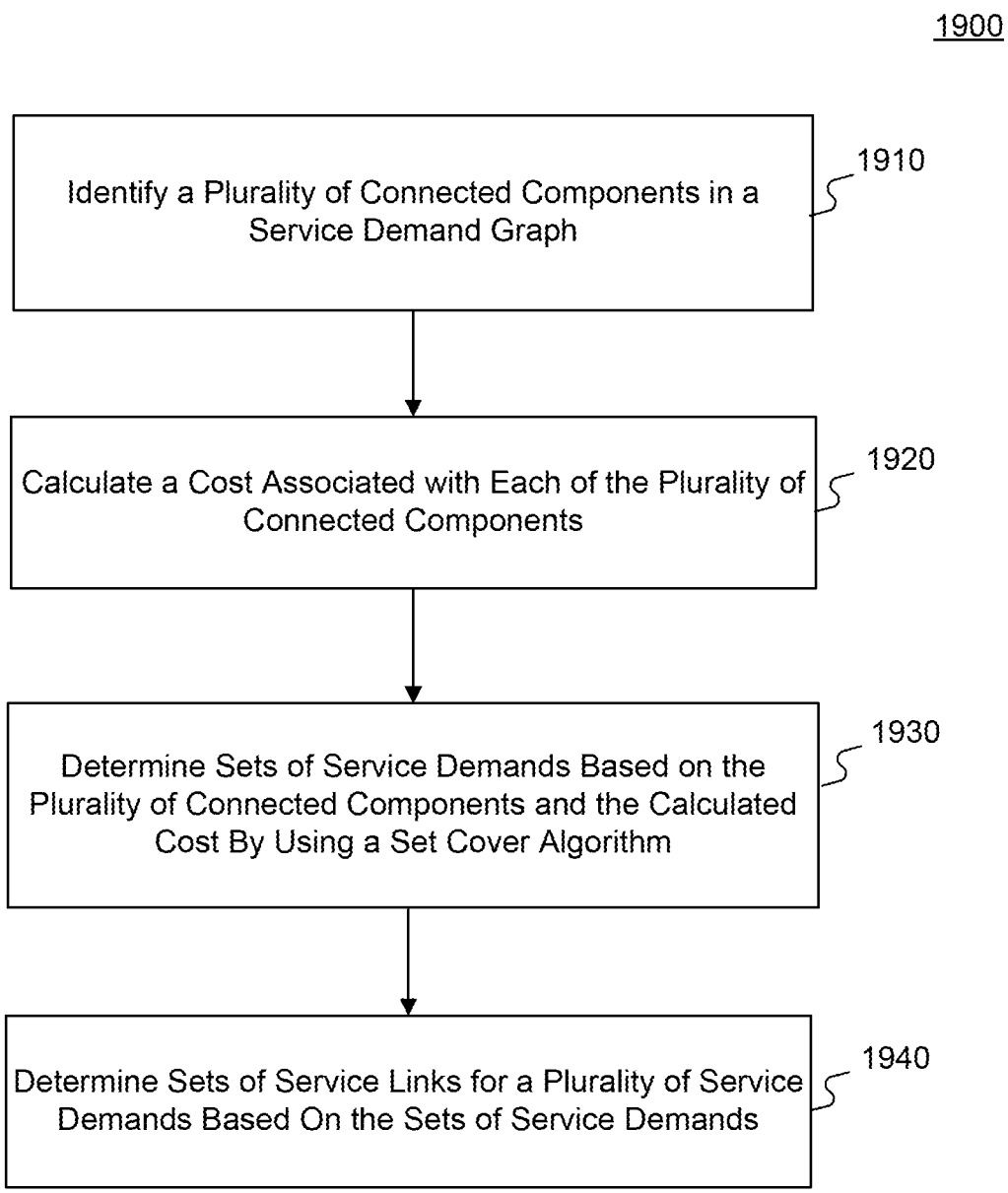
FIG. 19 is a flowchart of an example process for determining service links for a data communication network, consistent with the disclosed embodiments.

FIG. 19 is a flowchart of an example process 1900 for determining service links for a data communication network, consistent with the disclosed embodiments. The steps associated with this example process is described in relation to a network management system, such as network management system 150 of FIG. 1. One of ordinary skill in the art would appreciate that the steps associated with this example process may also be performed by, for example, a processor of the network devices 120 or a server of the data communication network. The example process 1900 allows using a reduced number of service links to satisfy the service demands in the data communication network.

In step 1910, the network management system identifies a plurality of connected components in a service demand graph. Each of the connected components is formed by one or more edges and one or more vertices, and the number of edges included in each of the plurality of connected components is less than or equal to a predetermined size threshold. In some embodiments, a service demand graph is constructed identifying sets of service demands that are candidates for grooming in the data communication network. The service demand graph includes a plurality of vertices corresponding to end points of service demands. In the service demand graph, a first vertex corresponding to first service demand is connected with a second vertex corresponding to the second service demand with an edge when the first service demand and the second service demand have a common service demand end point. The network management system may determine the connected components based on the service demand graph.

Figure 20:
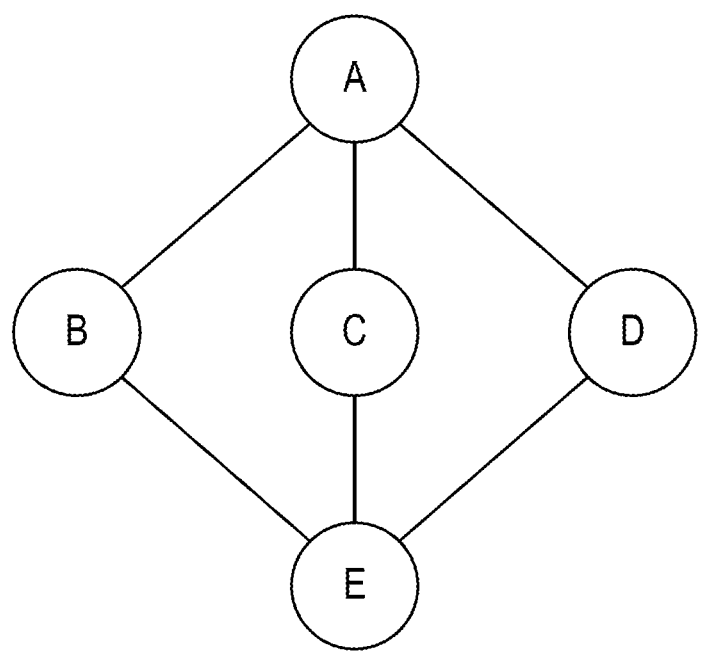
FIG. 20 is a diagram illustrating a service demand graph in a data communication network, in accordance with embodiments of the present disclosure.

FIG. 20 is a diagram illustrating a service demand graph 2000 in a data communication network, in accordance with embodiments of the present disclosure. In this example, the service demands in the data communication network includes <A, B>, <A, C>, <A, D>, <E, B>, <E, C>, and <E, D>. A predetermined size threshold is set to two in this example. As shown in FIG. 20, the service demand graph 2000 includes all the end points of the service demands in the data communication network, and the source and destination nodes of a service demand are connected with an edge. For example, the source and destination nodes of the service demand <A, B> are connected by an edge between node A and node B. As another example, the source and destination nodes of the service demand <E, B> are connected by an edge between node E and node B. As a common end point B is shared between service demands <A, B> and <E, B>, the service demands <A, B> and <E, B> form a connected component (AB, EB) via the shared node B.

Based on service demand graph 2000, the connected components with edge-size less than or equal to the predetermined size threshold, which is set to two in this example, can be identified. For example, the connected components with size equaling one include the edge formed by each service demand, i.e., (AB), (AC), (AD), (EB), (EC), (ED). Here (x, y) denotes an edge between node x and node y. The connected components with size equaling two include two connected edges in the service demand graph, i.e., (AB, AC), (AB, AD), (AC, AD), (EB, EC), (EB, ED), (EC, ED), (AB, EB), (AC, EC), (AD, ED). As a result, the set of connected components with size less than or equal to the predetermined size threshold includes the follows: {(AB), (AC), (AD), (EB), (EC), (ED), (AB, AC), (AB, AD), (AC, AD), (EB, EC), (EB, ED), (EC, ED), (AB, EB), (AC, EC), (AD, ED)}.

In step 1920, the network management system calculates a cost associated with each of the plurality of connected components. For example, costs for the connected components in the service demand graph 2000 may be calculated. The cost for the connected component may depend on the number of service links required for the connected component. For example, the cost for connected component (AC) may be higher than the cost for connected component (AB) when the connected component (AC) requires more service links than the connected component (AB). The cost for the connected component may also take into account the amount of resources required to satisfy the service demand(s), the capacity of the service links, the quality of service requirements for the service demand(s), or the like. Table 6 provides an example cost for the connected components in the service demand graph 2000.

TABLE 6

Costs Associated with Connected Components

| Connected Component | Cost |
|---|---|
| (AB) | 1 |
| (AC) | 4 |
| (AD) | 8 |
| (EB) | 8 |
| (EC) | 8 |
| (ED) | 8 |
| (AB, AC) | 3 |
| (AB, AD) | 6 |
| (AC, AD) | 3 |
| (EB, EC) | 1 |
| (EB, ED) | 2 |
| (EC, ED) | 5 |
| (AB, EB) | 6 |
| (AC, EC) | 7 |
| (AD, ED) | 4 |

In step 1930, the network management system determines sets of service demands based on the plurality of connected components and the calculated cost by using a set cover algorithm. The sets of service demands may be used to determine a plurality of service links for the plurality of service demands in the data communication network. In some embodiments, the set cover algorithm may include a greedy algorithm or an integer linear programming. The set cover algorithm identifies a subset of connected components with the least cost to cover the plurality of service demands in the data communication network. For example, using a set cover algorithm on the connected components listed on Table 6, a set cover {(AB), (EB, EC), (AC, AD), (EB, ED)} may be determined, which corresponds to the sets of service demands for determining the service links. The set cover covers all service demands in this example network with a total cost of 7.

In step 1940, the network management system determines sets of service links for the plurality of service demands based on the sets of service demands. For example, the network management system may determine sets of service links used for the set cover {(AB), (EB, EC), (AC, AD), (EB, ED)}. The service links assigned for each connected component may be predetermined by a network server. The sets of service links can be used to satisfy other service demands in the data communication network, such as service demands <A, C>, <A, D>, <E, B>, <E, C>, and <E, D>. For example, Table 7 shows service links assigned to each connected component in the service demand graph 2000. When the sets of service demands are determined to be {(AB), (EB, EC), (AC, AD), (EB, ED)}, the sets of service links are determined to include the service links assigned to each connected component in the sets of service demands, which are $\{r_1, r_2, r_3, r_4, r_5, r_7\}$ for the sets of demands{(AB), (EB, EC), (AC, AD), (EB, ED)}.

TABLE 7

Service Links for Connected Components

| Connected Component | Corresponding Service Links |
|---|---|
| (AB) | {$r_1, r_2, r_3$} |
| (AC) | {$r_1, r_2$} |
| (AD) | {$r_1, r_3, r_5$} |
| (EB) | {$r_2, r_3$} |
| (EC) | {$r_2, r_4$} |
| (ED) | {$r_2, r_3, r_5$} |
| (AB, AC) | {$r_3, r_5, r_7$} |
| (AB, AD) | {$r_2, r_5, r_6$} |
| (AC, AD) | {$r_2, r_3, r_7$} |
| (EB, EC) | {$r_2, r_5$} |
| (EB, ED) | {$r_2, r_3, r_4$} |
| (EC, ED) | {$r_2, r_5, r_8$} |
| (AB, EB) | {$r_2, r_5, r_6, r_7$} |
| (AC, EC) | {$r_1, r_5, r_8$} |
| (AD, ED) | {$r_3, r_6, r_8$} |

In exemplary embodiments, a non-transitory computer-readable storage medium including instructions is also provided, and the instructions may be executed by a device (such as a computer), for performing the above-described methods. For example, the non-transitory computer-readable storage medium may be a read-only memory (ROM), a Random Access Memory (RAM), an electrically erasable programmable read-only memory (EEPROM), Programmable Array Logic (PAL), a disk, an optical disc, a Digital Versatile Disc (DVD), and so on.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A method for providing one or more restoration paths in a data communication network, comprising:
    identifying a failure in one or more service paths of the data communication network;
    determining one or more affected service links in the data communication network based on the identified failure and a first data structure, wherein the first data structure includes a plurality of service paths, and for each of the service paths, the first data structure indicates each of one or more service links in the data communication network that use the plurality of service paths;
    determining one or more affected service demands based on the affected service links and a second data structure,
    wherein the second data structure includes a plurality of service links provided by the data communication network, and for each of the service links, the second data structure indicates each of one or more service demands in the data communication network that can be satisfied by using the plurality of service links, and wherein the second data structure is different from the first data structure,
    wherein the one or more service demands in the second data structure require service delivered from a first service node to a second service node;
    for each of the affected service demands, determining one or more allowed service links by removing the affected service links from a set of corresponding service links for the affected service demands; and
    for each of the affected service demands, determining the one or more restoration paths based on the one or more allowed service links.

2. The method of claim 1, wherein the one or more restoration paths are determined by using a Dijkstra's algorithm.

3. The method of claim 1, further comprising:
    for each of the affected service demands, constructing a network graph including a plurality of service nodes and one or more service links, wherein the affected service links are excluded from the network graph.

4. The method of claim 1, wherein the one or more allowed service links are determined based on a third data structure, the third data structure including a plurality of service demands and a corresponding set of service links that can be used by the plurality of service demands.

5. The method of claim 4, wherein the one or more restoration paths are determined based on a fourth data structure, the fourth data structure including the plurality of service links provided by the data communication network, one or more corresponding service paths, and a corresponding cost metric.

6. A network management system for migrating a plurality of communications services in a data communication network, the system comprising:
    at least one processor; and
    a memory for storing instructions executable by the at least one processor;
    wherein the at least one processor is configured to:
    identify a failure in one or more service paths of the data communication network;
    determine one or more affected service links in the data communication network based on the identified failure and a first data structure, wherein the first data structure includes a plurality of service paths, and for each of the service paths, the first data structure indicates each of one or more service links in the data communication network that use the plurality of service paths;
    determine one or more affected service demands based on the affected service links and a second data structure,
    wherein the second data structure includes a plurality of service links provided by the data communication network, and for each of the service links, the second data structure indicates each of one or more service demands in the data communication network that can be satisfied by using the plurality of service links, and wherein the second data structure is different from the first data structure,
    wherein the one or more service demands in the second data structure require service delivered from a first service node to a second service node;
    for each of the affected service demands, determine one or more allowed service links by removing the affected service links from a set of corresponding service links for the affected service demands; and
    for each of the affected service demands, determine the one or more restoration paths based on the one or more allowed service links.

7. The network management system of claim 6, wherein the one or more restoration paths are determined by using a Dijkstra's algorithm.

8. The network management system of claim 6, wherein the at least one processor is further configured to:
  for each of the affected service demands, construct a network graph including a plurality of service nodes and one or more service links, wherein the affected service links are excluded from the network graph.

9. The network management system of claim 6, wherein the one or more allowed service links are determined based on a third data structure, the third data structure including a plurality of service demands and a corresponding set of service links that can be used by the plurality of service demands.

10. The network management system of claim 9, wherein the one or more restoration paths are determined based on a fourth data structure, the fourth data structure including the plurality of service links provided by the data communication network, one or more corresponding service paths, and a corresponding cost metric.

11. A non-transitory computer readable medium storing a set of instructions that is executable by at least one processor of a network management system to cause the network management system to perform operations for providing one or more restoration paths in a data communication network, the operations comprising:
  identifying a failure in one or more service paths of the data communication network;
  determining one or more affected service links in the data communication network based on the identified failure and a first data structure, wherein the first data structure includes a plurality of service paths, and for each of the service paths, the first data structure indicates each of one or more service links in the data communication network that use the plurality of service paths;
  determining one or more affected service demands based on the affected service links and a second data structure, wherein the second data structure includes a plurality of service links provided by the data communication network, and for each of the service links, the second data structure indicates each of one or more service demands in the data communication network that can be satisfied by using the plurality of service links, and wherein the second data structure is different from the first data structure,
  wherein the one or more service demands in the second data structure require service delivered from a first service node to a second service node;
  for each of the affected service demands, determining one or more allowed service links by removing the affected service links from a set of corresponding service links for the affected service demands; and
  for each of the affected service demands, determining the one or more restoration paths based on the one or more allowed service links.

12. The non-transitory computer readable medium of claim 11, wherein the one or more restoration paths are determined by using a Dijkstra's algorithm.

13. The non-transitory computer readable medium of claim 11, wherein the operations further comprise:
  for each of the affected service demands, constructing a network graph including a plurality of service nodes and one or more service links, wherein the affected service links are excluded from the network graph.

14. The non-transitory computer readable medium of claim 11, wherein the one or more allowed service links are determined based on a third data structure, the third data structure including a plurality of service demands and a corresponding set of service links that can be used by the plurality of service demands.

15. The non-transitory computer readable medium of claim 14, wherein the one or more restoration paths are determined based on a fourth data structure, the fourth data structure including the plurality of service links provided by the data communication network, one or more corresponding service paths, and a corresponding cost metric.

* * * * *